US009758387B2

(12) United States Patent
Gruett et al.

(10) Patent No.: US 9,758,387 B2
(45) Date of Patent: *Sep. 12, 2017

(54) METHODS RELATED TO PROPORTIONAL REGENERATION OF WATER TREATMENT SYSTEMS

(71) Applicant: WATER-RIGHT, INC., Appleton, WI (US)

(72) Inventors: Kurt Gruett, Combined Locks, WI (US); Guy Gruett, Neenah, WI (US); Gregory C. Gruett, Lititz, PA (US)

(73) Assignee: Water-Right, Inc., Appleton, WI (US)

( * ) Notice: Subject to any disclaimer, the term of this patent is extended or adjusted under 35 U.S.C. 154(b) by 435 days.

This patent is subject to a terminal disclaimer.

(21) Appl. No.: 14/520,009

(22) Filed: Oct. 21, 2014

(65) Prior Publication Data
US 2015/0090663 A1 Apr. 2, 2015

Related U.S. Application Data

(63) Continuation-in-part of application No. 13/279,694, filed on Oct. 24, 2011, now Pat. No. 8,865,001, and
(Continued)

(51) Int. Cl.
B01J 47/14 (2017.01)
C02F 1/28 (2006.01)
(Continued)

(52) U.S. Cl.
CPC .............. C02F 1/42 (2013.01); B01J 49/75 (2017.01); B01J 49/85 (2017.01); C02F 1/008 (2013.01);
(Continued)

(58) Field of Classification Search
CPC ......... A61M 1/16; B01D 15/00; B01D 35/00; B01D 17/0217; B01J 20/32; B01J 39/00; B01J 45/00
See application file for complete search history.

(56) References Cited

U.S. PATENT DOCUMENTS 3,151,064 A 9/1964 Lathrop
3,687,289 A 8/1972 Tischler
(Continued)

FOREIGN PATENT DOCUMENTS

WO    WO 97/30943    8/1997

OTHER PUBLICATIONS

Office Action dated Jul. 11, 2013 cited in U.S. Appl. No. 13/279,694, filed Oct. 24, 2011.
(Continued)

Primary Examiner — Dirk Bass
Assistant Examiner — Hayden Brewster
(74) Attorney, Agent, or Firm — Ryan Kromholz & Manion, S.C.

(57) ABSTRACT

A method for fluid treatment that provides variable or alternative regeneration cycles within the same fluid treatment device. The duration of all stages of the regeneration cycle can be adjusted depending upon the amount of fluid treated so that regenerant resources such as water are not underutilized and waste is not discharged unnecessarily into the environment. Additionally or alternatively, a regeneration sequence may include a fluid release sequence in which a fluid is released from a water treatment tank by successive linear movement of a piston in a valve assembly.

8 Claims, 21 Drawing Sheets

Related U.S. Application Data a continuation-in-part of application No. 13/151,492, filed on Jun. 2, 2011, now Pat. No. 8,945,384.

(51) Int. Cl.
  *C02F 1/42* (2006.01)
  *B01J 49/75* (2017.01)
  *B01J 49/85* (2017.01)
  B01D 15/00 (2006.01)
  B01D 35/00 (2006.01)
  C02F 1/00 (2006.01)

(52) U.S. Cl.
  CPC .............. *C02F 1/001* (2013.01); *C02F 1/28* (2013.01); *C02F 2209/006* (2013.01); *C02F 2209/03* (2013.01); *C02F 2209/40* (2013.01); *C02F 2209/445* (2013.01); *C02F 2303/16* (2013.01)

(56) References Cited

U.S. PATENT DOCUMENTS

| | | |
|---|---|---|
| 4,104,158 A | 8/1978 | Davis |
| 4,385,992 A | 5/1983 | Clauer et al. |
| 4,470,911 A | 9/1984 | Reinke |
| 4,490,249 A | 12/1984 | Seal |
| 4,659,463 A | 4/1987 | Chandler et al. |
| 4,668,402 A | 5/1987 | Norton |
| 4,722,797 A | 2/1988 | Gauer et al. |
| 4,885,084 A | 12/1989 | Doyle |
| 4,966,692 A | 10/1990 | Overy |
| 4,990,245 A | 2/1991 | Wieme |
| 5,022,994 A | 6/1991 | Avery et al. |
| 5,060,167 A | 10/1991 | Ticcioni et al. |
| 5,096,596 A | 3/1992 | Hellenbrand et al. |
| 5,234,601 A | 8/1993 | Janke et al. |
| 5,351,199 A | 9/1994 | Ticcioni et al. |
| 5,628,899 A | 5/1997 | Vaughan |
| 5,660,721 A | 8/1997 | Kyriss et al. |
| 5,751,598 A | 5/1998 | Zabinski et al. |
| 5,919,373 A | 7/1999 | Naaktgeboren |
| 6,129,836 A | 10/2000 | Grayson |
| 6,206,042 B1 | 3/2001 | Channell et al. |
| 6,214,214 B1 | 4/2001 | Hansen et al. |
| 6,235,200 B1 | 5/2001 | Mace |
| 6,263,908 B1 | 7/2001 | Love et al. |
| 6,325,943 B1 | 12/2001 | Kohlenberg |
| 6,402,944 B1 | 6/2002 | Vaughan |
| 6,444,127 B1 | 9/2002 | Vaughan et al. |
| 6,627,070 B1 | 9/2003 | Frank |
| 6,644,349 B2 | 11/2003 | Scanlan et al. |
| 6,790,362 B2 | 9/2004 | FitzGerald et al. |
| 6,814,872 B2 | 11/2004 | Rawson |
| 6,926,821 B2 | 8/2005 | Giordano et al. |
| 6,926,835 B2 | 8/2005 | Iizuka et al. |
| 7,300,569 B2 | 11/2007 | Petty |
| 7,338,595 B2 | 3/2008 | VanNewenhizen et al. |
| 7,488,424 B2 | 2/2009 | Gruett et al. |
| 7,491,321 B1 | 2/2009 | Maas et al. |
| 7,556,738 B2 | 7/2009 | Premathilake et al. |
| 7,563,361 B2 | 7/2009 | Gruett et al. |
| 7,563,362 B2 | 7/2009 | Jeong |
| 7,608,183 B2 | 10/2009 | Lillback |
| 7,638,063 B1 | 12/2009 | Maas et al. |
| 7,722,760 B2 | 5/2010 | Griesbach |
| 7,966,097 B2 | 6/2011 | Zimmerman |
| 8,500,999 B2 | 8/2013 | Tischendorf et al. |
| 8,691,091 B2 | 4/2014 | Prescott |
| 8,865,001 B2 * | 10/2014 | Gruett .................... B01D 29/66 210/662 |
| 2006/0266710 A1 | 11/2006 | Premathilake et al. |
| 2007/0262024 A1 | 11/2007 | Gruett et al. |
| 2009/0178555 A1 | 7/2009 | Crits et al. |
| 2010/0222928 A1 | 9/2010 | Jeong |
| 2012/0305488 A1 * | 12/2012 | Gruett .................... C02F 1/008 210/660 |

OTHER PUBLICATIONS

Office Action dated Jan. 13, 2014 cited in U.S. Appl. No. 13/279,694, filed Oct. 24, 2011.
Office Action dated Jul. 17, 2014 cited in U.S. Appl. No. 13/151,492, filed Jun. 2, 2011.
Webpage, www.rainsoft.com, RainSoft EC4 Series Water Conditioner Systems for Home Use, Dated Jul. 20, 2011, 1 page.
Webpage, www.aquadialwaterfilters.co.uk, Aquadial PWebrismertec II Water Softener, Dated Jul. 20, 2011, 3 pages.
Webpage, www.pegasuswater.com, Water Softeners, Dated Jul. 20, 2011, 2 pages.
Webpage, www.dulcosoft.com, Dulco-Soft DMEa WZT triplex volume controlled water softeners, Dated Jul. 20, 2011, 2 pages.
Webpage, www.hellenbrand.com; ProMate 6.0 Water Conditioning System, Dated 2007-2010, 4 pages.

* cited by examiner

SERVICE

BACKWASH

DOWNFLOW BRINE

UPFLOW BRINE

RINSE

FILL

SERVICE

BACKWASH

METHODS RELATED TO PROPORTIONAL REGENERATION OF WATER TREATMENT SYSTEMS

RELATED APPLICATIONS

This application claims the benefit of and is a continuation-in-part of co-pending U.S. patent application Ser. No. 13/279,694 filed 24 Oct. 2011, entitled "Proportional Regeneration for Water Treatment Systems," which is incorporated by reference herein in its entirety. This application also claims the benefit of and is a continuation-in-part of co-pending U.S. patent application Ser. No. 13/151,492 filed 2 Jun. 2011, entitled "Methods and Systems for Fluid Treatment Having Fluid Release Cycle," which is incorporated by reference herein in its entirety.

BACKGROUND OF THE INVENTION

The present invention relates to methods of fluid treatment that use ion exchange processes or filtering processes to treat the fluids. In particular, the present invention relates to methods and systems that may provide alternate or modified exchange processes within the same system. The alternate or modified exchange processes are a function of past use, predicted future use and/or system load factors. The present invention also relates to methods and systems that provide a fluid release cycle that precedes a selected cycle in the regeneration of a fluid treatment device or system. Fluid filtering and fluid softening processes are becoming more and more common processes and are used in all different situations and environments, from industrial and municipal installations, to individual water filtration systems for homes and houses.

Fluid filtering and fluid softening processes are becoming more and more common processes and are used in all different situations and environments, from industrial and municipal installations, to individual water filtration systems for homes and houses. Many of the softening fluid treatment processes are ion exchange processes that regenerate ion exchange media and media beds used during the fluid treatment. Regeneration fluids are passed through the bed of depleted ion exchange media during which ions are exchanged between the regenerate solution and the depleted media. In the case of filter media, regeneration fluids are passed through filter media to precipitate the contaminants or to filter out turbidity. As used herein, the terms "on exchange media" and/or "filter media" and/or "media" are defined broadly to include, as examples, resins, and zeolites, natural and synthetic types of both, carbon and activate carbon, activated alumina, and any other amorphous or microcrystalline structures commonly used in exchange and/or filtering processes. Regenerates for the ion exchange media also cover a broad spectrum of compounds, including potassium permanganate, potassium chloride, hydrogen peroxide, sodium chloride, or any other chemical or compound used to recharge, reactivate, oxidize, or rejuvenated a material bed. A common ion exchange media includes high capacity ion exchange resin.

Current processes and systems allow for basic programming of a regeneration cycle to be undertaken during an ion exchange or media regeneration process. Generally, a regeneration cycle will include one or more steps of backwashing the ion exchange or filter media, regenerating the media, rinsing the media, and servicing the media. Current systems and devices allow for individual cycles to be programmed into the system or device.

It is known in the art that the duration of the regenerating step or brining step may be modified in an ion exchange device such as a water softener. For example, U.S. Pat. No. 4,472,797 (Gauer et al.) discloses a method and apparatus for selecting the quantity of salt to be used during each regeneration of a water softener system. Similarly, U.S. Pat. No. 7,556,738 (Premathilake et al.) discloses an alternate method of measuring the strength of the regenerant or brine (salt) solution during service and measuring the strength again during regeneration is disclosed. In both prior art patents, the disclosed methods maximize the efficient use of salt during regeneration step.

Many of these fluid treatment processes are air chamber, ion exchange and/or micronizer processes that regenerate ion exchange media and/or filter media beds used during the fluid treatment. In some environments, the fluid to be treated contains gas that is released during the treatment process. Regeneration fluids are passed through the bed of ion exchange media or saturated filter media during which ions may be exchanged in the case of a water softener or precipitated in the case of a filter media. As used herein, the terms "ion exchange media" and/or "filter media" and/or "media" are defined broadly to include, as examples, resins, and zeolites, natural and synthetic types of both, carbon and activated carbon, activated alumina, and any other amorphous or microcrystalline structures commonly used in exchange and/or filtering processes. Regenerates for the media also cover a broad spectrum of compounds, including potassium permanganate, potassium chloride, hydrogen peroxide, sodium chloride, or any other chemical or compound used to recharge, reactivate, oxidize, or rejuvenated a media bed. A common ion exchange media includes high capacity ion exchange resin.

Current processes and systems for use allow for basic programming of a regeneration cycle to be undertaken during an ion exchange or media regeneration process. Generally, a regeneration cycle will include one or more steps of backwashing the ion exchange or filter media, regenerating the media, rinsing the media, and servicing the media. Current systems and devices allow for individual cycles to be programmed into the system or device.

However, there are no known devices in the prior art that allow for alternate or modified regeneration cycles to be programmed and operated within a water treatment system, and especially within a residential treatment system. Such a method and system will save resources, such as water. For example, if a regeneration cycle is needed before the capacity of the system has been depleted, the present system will modify steps of the regeneration cycle including the steps of backwashing the ion exchange or filter media, and rinsing the media to a shorter time period. Alternatively, if the amount of water consumed exceeds the capacity of the system, the present system will modify each step of the regeneration cycle to a longer time period. Also, there are no known devices in the prior art that allow for a fluid release cycle to be programmed and operated independently of the backwashing cycle of a water treatment system, and especially within a residential treatment system. Such a system, with the fluid release backwashing cycle, would be an advantage over the prior art. Such a system, especially for a residential application, would be an advantage over the prior art.

SUMMARY OF THE INVENTION

An embodiment of a method according to the present invention provides a method of treating water, including the steps of providing a water treatment device having a programmable controller coupled to a valve assembly which controls fluid flow between a plurality of ports. The controller is configured to manage a first regeneration sequence followed by a second regeneration sequence. Each of the first and second regeneration sequences comprises one or more correlative regeneration cycles wherein the controller has been programmed with a predetermined capacity of the treatment device, and a first predetermined duration for each regeneration cycle of the first regeneration sequence. Prior to an initiation of the second regeneration sequence, a volume of water passed through the water treatment device since the completion of a prior regeneration sequence may be measured. The controller may initiate the first regeneration sequence, after which the controller may be programmed with a second predetermined duration for at least one correlative regeneration cycle of the second regeneration sequence, the second predetermined duration being substantially equivalent to the first predetermined duration of the correlative regeneration cycle of the first regeneration sequence multiplied by the measured volume of water divided by the predetermined capacity of the treatment device. During at least one of the first regeneration sequence and second regeneration sequence, a piston in the valve assembly may be moved linearly through a plurality of successive steps of about 0.001 inches to about 0.005 inches.

According to an aspect of an embodiment of a method according to the present invention, the first regeneration sequence may have at least one cycle selected from the group consisting of: backwash, down brine, up brine, rinse, rapid rinse and brine tank fill.

According to another aspect of an embodiment of a method according to the present invention, the second regeneration sequence may occur at a predetermined time of day.

According to still another aspect of an embodiment of a method according to the present invention, the second regeneration sequence may occur during a time period of minimal water use.

According to yet another aspect of an embodiment of a method according to the present invention, the method may further include the steps of, with the controller, automatically computing an average amount of water treated on a predetermined day, computing the remaining capacity of the device by subtracting the measured volume of water passed through the water treatment device since the completion of the first regeneration sequence, comparing the remaining capacity with the average amount of water treated on the predetermined day and initiating the second regeneration sequence if the amount of water treated on the predetermined day exceeds the remaining capacity.

According to a further aspect of an embodiment of a method according to the present invention, the second regeneration sequence may have more regeneration cycles than the first regeneration sequence.

According to still a further aspect of an embodiment of a method according to the present invention, the second regeneration sequence may have fewer regeneration cycles than the first regeneration sequence.

According to yet a further aspect of an embodiment of a method according to the present invention, the method may further include the step of pausing the linear movement of the piston between two of the successive steps for a predetermined period of time.

DESCRIPTION OF THE PREFERRED EMBODIMENT

Figure 1A:
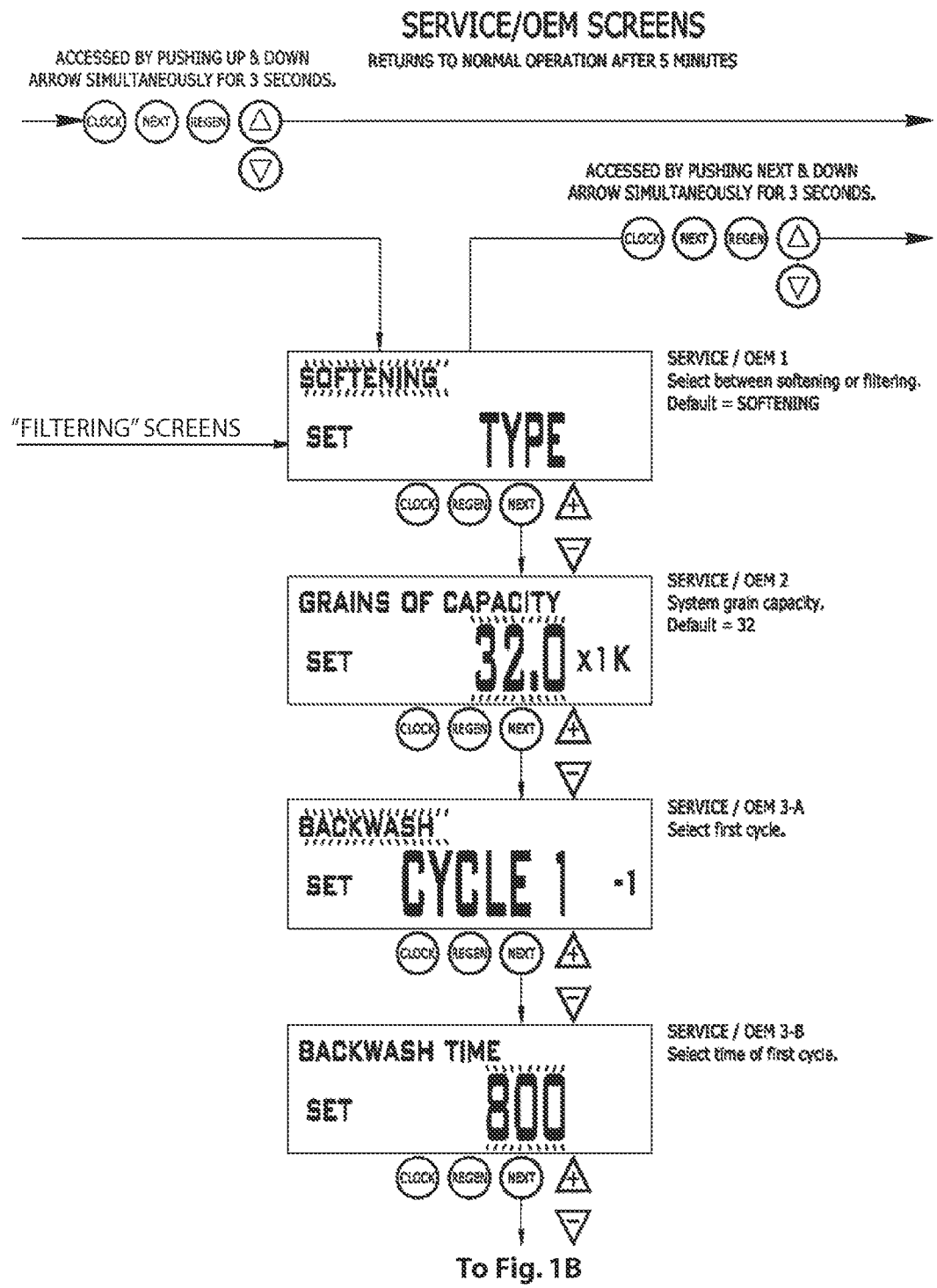
FIG. 1A-1B is a flow chart of the manufacturer setup screens of a regeneration system according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

The present invention provides systems and methods comprising modified regeneration cycling operations for treating and monitoring fluids in a fluid treatment apparatus, such as a water treatment system. The invention allows for modified or alternative regeneration sequences to be incorporated in a single fluid treatment apparatus and method. For instance, the present invention allows a water softening system to adjust some cycles of its regeneration sequence depending upon the actual amount of fluid that has passed through the system. Such a system will minimize the waste of resources.

The water softener system of the present invention employs a method of reducing the regenerate water used in the softener regeneration sequence by adjusting the time, presence, and/or order of regeneration cycles. The adjustments are made based on either time since last regeneration, volume of water treated, a sensor in the system, or other triggering events.

Water softeners or filters have a predetermined capacity and typically regenerate based on a predetermined volume of water used. Since most softeners and filters delay their regeneration until a predetermined no or low water use period, not all capacity is used. Based on this unused capacity, the softener or filter of the present invention will adjust the regeneration cycles either by percentage or a fixed number thus using less water. Softeners often use a "days over ride" feature in conjunction with a meter, sensor, or other triggering device, to trigger a regeneration sequence. If the full capacity of the softener or filter is not used prior to reaching the time limit ("days over ride"), the amount of water treated will be calculated and the device will adjust selected regeneration cycle times either by a percentage or a fixed number.

Water softeners and filters which regenerate based on time (for example every 3 days) may employ a meter or other method to measure the amount of water treated. Given the amount of water treated, the device of the present invention will compute the length of regeneration times based on the actual amount of water treated. A fixed minimum regeneration duration may be employed again depending on the triggering device in the case of no water usage and the triggering event is time. In a preferred embodiment, the regeneration duration would be reduced by no more than 50%. A fixed maximum regeneration length may be employed again based on the triggering event. In a preferred embodiment, the regeneration duration would be increased by no more than 130%.

EXAMPLE 1

A softener has a rated capacity of 1000 gallons before regeneration is to occur. Because this regeneration is to occur at a non or low use of water time period (for example 2:00 am) the unit will determine if enough water treatment capacity is in reserve to supply the user with treated water through the next day. If insufficient capacity is remaining, the unit will trigger regeneration.

If insufficient treatment capacity is indicated, the unit will regenerate automatically at its predetermined time; however, there may be unused capacity in the system or treatment device. This remaining capacity can be calculated and regeneration times altered based on a percentage of unused capacity. In a system with 1000 Gallons total capacity, the user has treated 800 gallons, and 300 gallons are needed for the next day's water usage, the unit will regenerate because of insufficient capacity remaining. However 200 gallons (1000-800) have not been used. Regeneration could occur with a 20% reduction in time of the regeneration cycles thus saving water.

Conversely if the triggering event for regeneration is amount of water treated and the total capacity of the system is "over run," the unit will make an upward adjustment to the selected regeneration cycles or add additional cycles allowing for a more thorough regeneration.

EXAMPLE 2

A filter may be programmed to regenerate at a minimum of every three days because of loading factors (pressure drop through system because of iron, manganese, sand, or any other turbidity). Based on the amount of water treated, the unit will compute the proper length of regeneration cycle times. If the 3 days is the triggering event and the total gallons treated is not achieved, the unit's regeneration cycle titter will be altered according by percentage. Conversely if the triggering event is consumption (as measured by a meter, sensor, etc.) and the total capacity is "over run," the unit will make an upward adjustment to the regeneration times allowing for a more though regeneration.

Figure 1B:
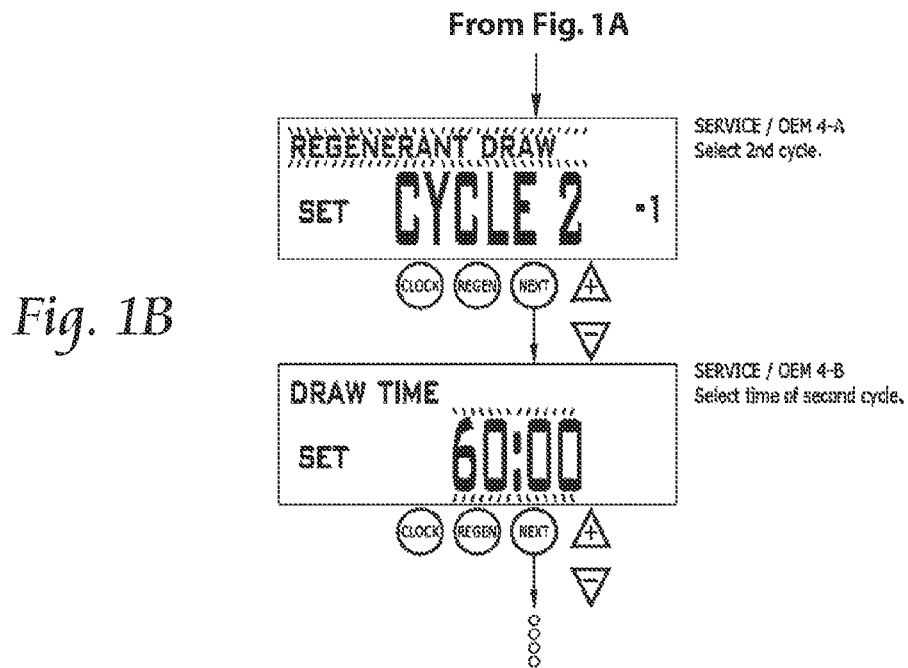

FIG. 1 shows a portion of a general flow chart for a typical program setup for a typical regeneration sequence including cycles 1 and 2. On a typical fluid treatment system that incorporates the present invention, the manufacturer will program the predetermined regeneration cycles. The manufacturer first selects what type of function the unit will perform. The unit is initially programmed to determine which individual cycles or stages will make up the selected regeneration sequence. The manufacturer then enters in the physical capacity of the system. In the case of a water softener, the unit will have a capacity of grains. For example and as shown in FIG. 1A, the unit may have a 32,000 grain capacity. As discussed herein, when the installer enters the hardness of the water to be treated, the capacity of the unit can be calculated. The manufacturer next sets the operating parameters for each of the cycles used in the regeneration sequence, with the duration of operation of each cycle also being entered.

Figure 2:
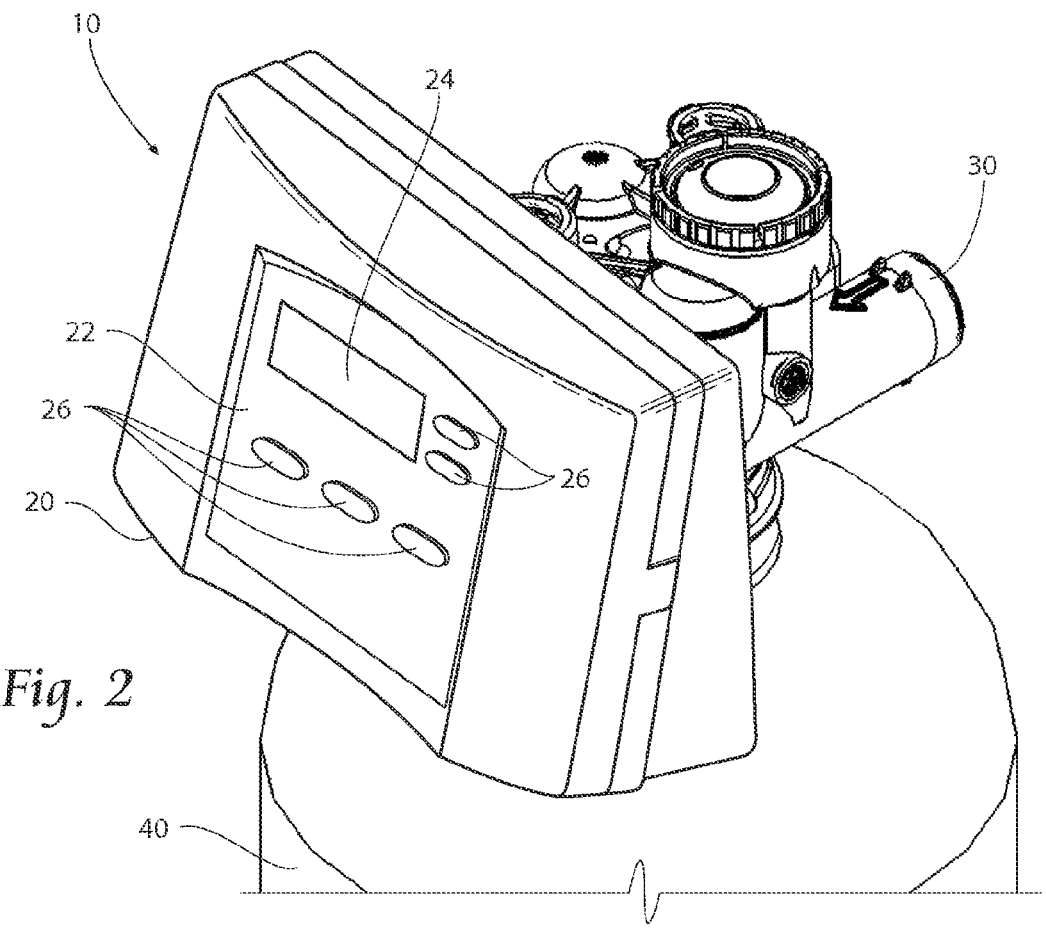
FIG. 2 shows a front perspective view of an apparatus that incorporates the present invention.
Figure 3:
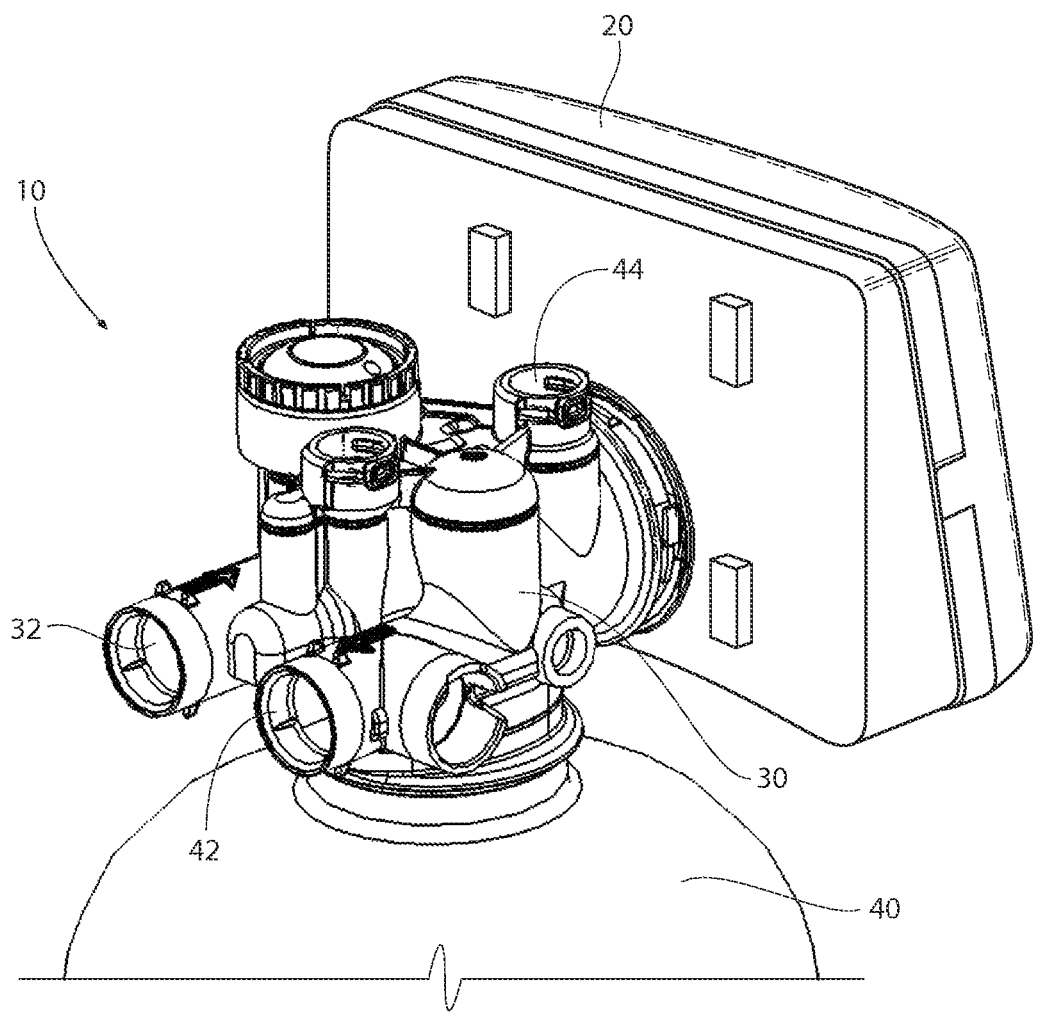
FIG. 3 shows a rear perspective view of the apparatus of FIG. 2.
Figure 4:
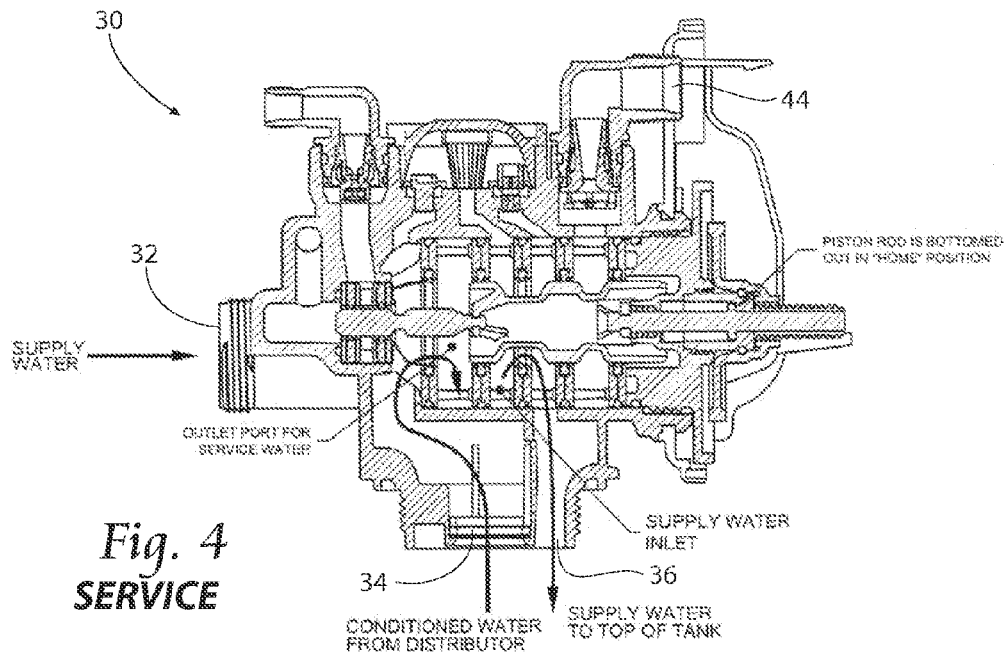
FIGS. 4-9 provide various exemplary flow patterns through a valve body used in connection with the present invention.
Figure 5:
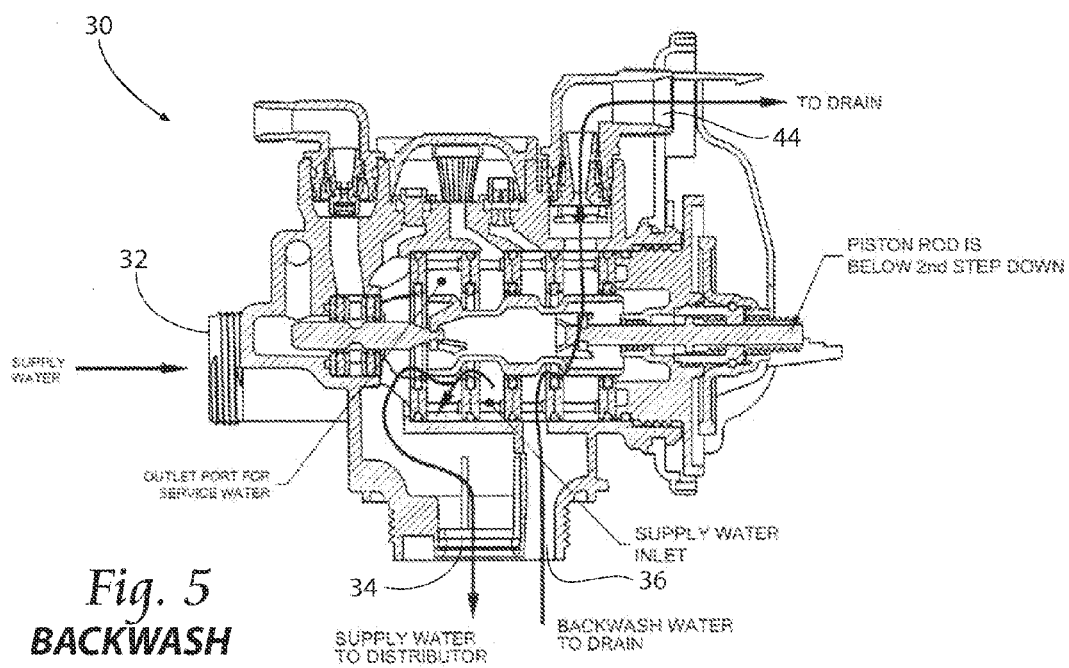
Figure 6:
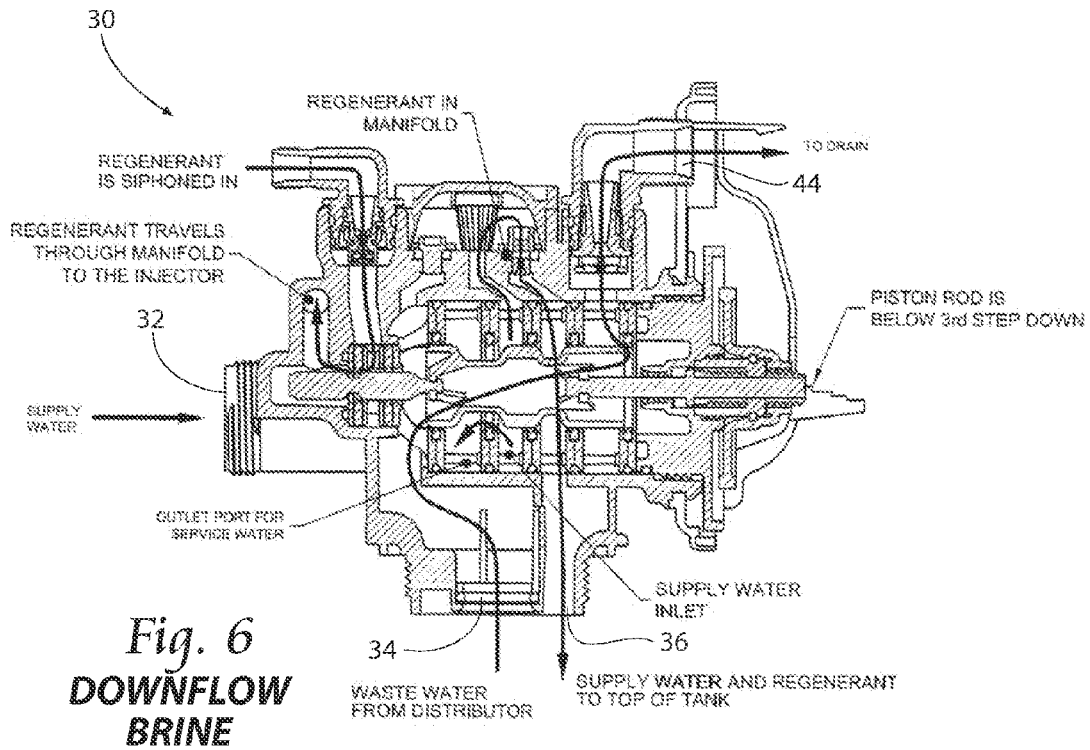
Figure 7:
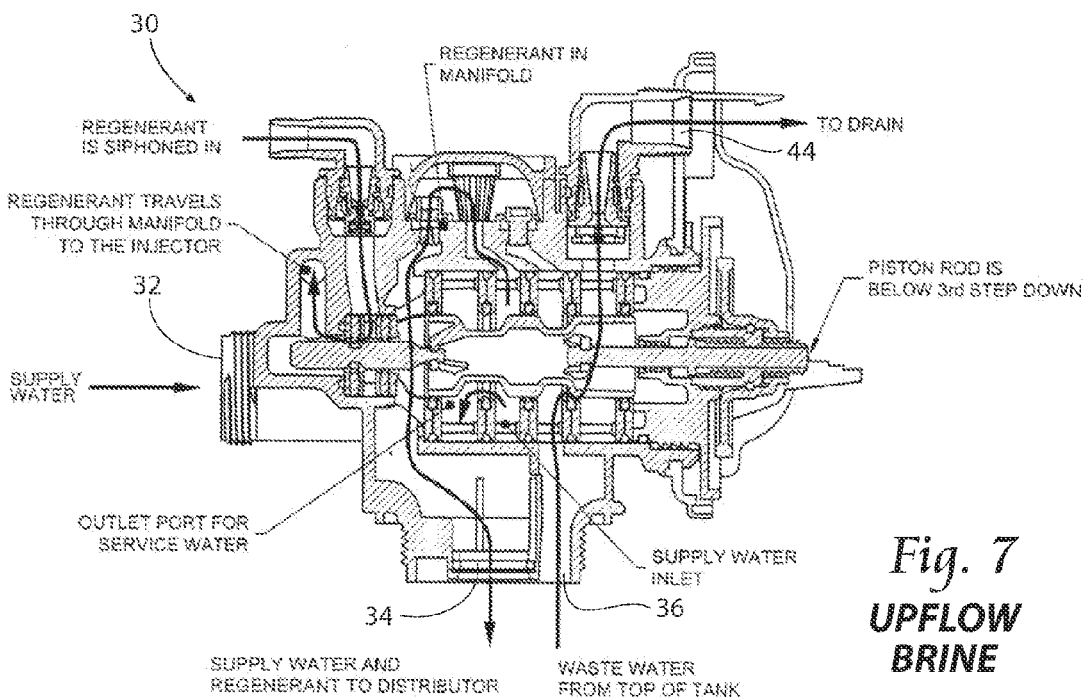
Figure 8:
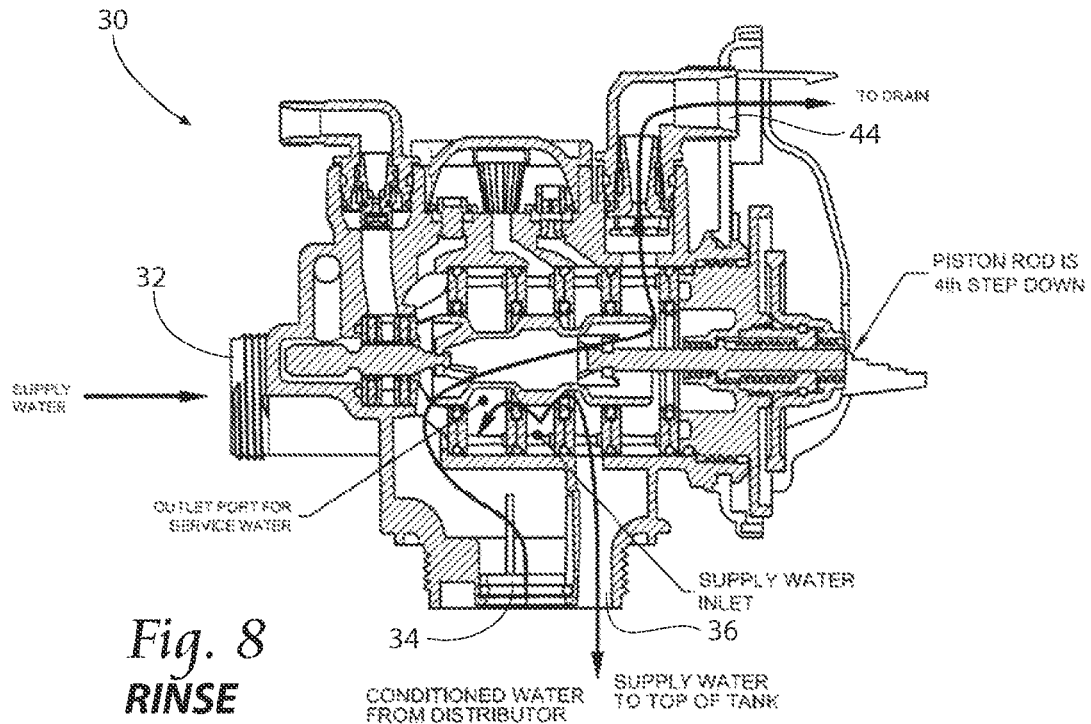
Figure 9:
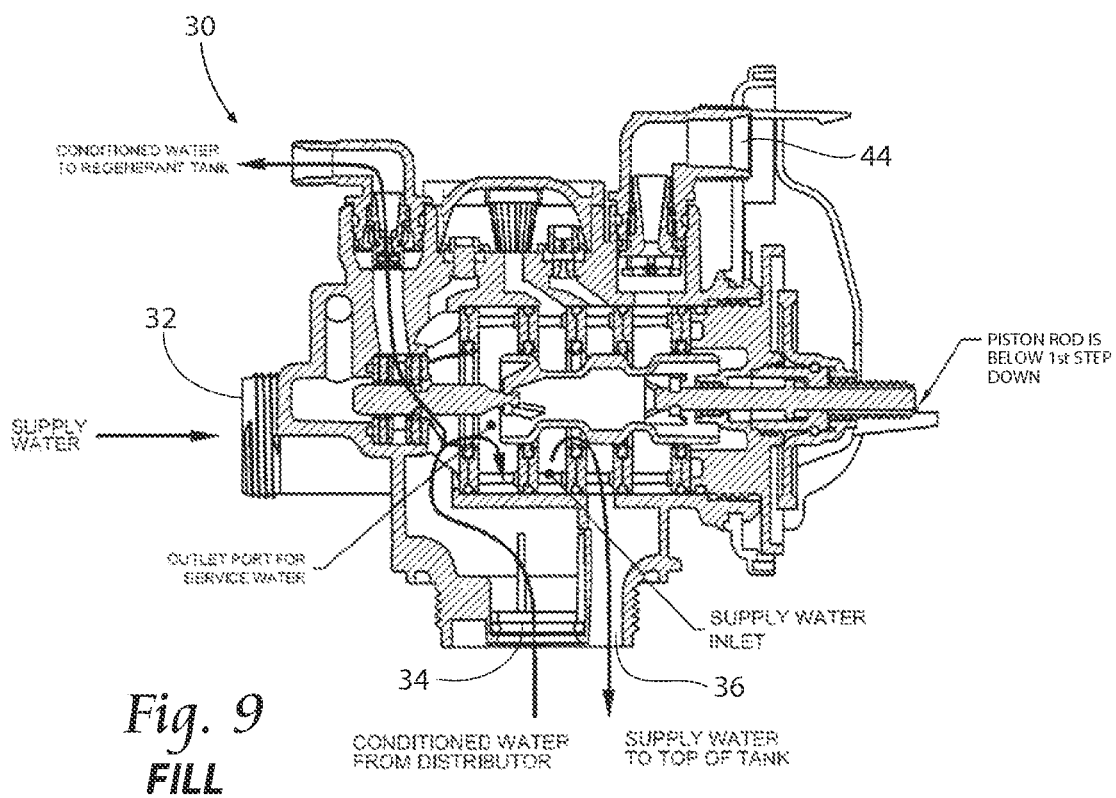

While the present invention may be embodied and employed in any of several fluid treatment apparatuses, examples of apparatuses can be seen in the following drawings. FIGS. 2 and 3 show a water treatment system 10. The system has a programmable controller 20 and valve body 30 that are supported on a treatment reservoir 40. The controller 20 has an interface 22, which provides an area for a display screen output 24, which is capable of displaying the flow chart depicted in FIG. 1. The controller also has various buttons 26 that allow the cycles to be programmed for the system 10.

Exemplary individual cycles are depicted passing through the multiple configurations of the valve body 30 in FIGS. 4-9. FIGS. 4-9 depict cross-sectional views of the valve body 30 performing various cycles or stages that may be carried out within each of the regeneration cycles. The terms used to describe the various cycles, Service (FIG. 4), Backwash 5), Downflow Brine (FIG. 6), Upflow Brine (FIG. 7), Rinse (FIG. 8), and Brine Tank Fill (FIG. 9), are common terms used by those having ordinary skill in the art of water treatment and, specifically, water treatment for home and non-industrial water treatment systems. However, it is to be understood that this list is not inclusive and that other cycles or stages could be utilized as well. The valve 30 has e fluid inlet 32, which allows untreated water into the valve body 30 and a fluid outlet 42 for treated water, which is shown in FIG. 3. Inlet/outlet 34 is connected to the reservoir 40 (through a draw tube or pipe not shown) and allows solution to be brought into the valve body 30 and circulated through the valve body 30. An inlet 36 is also connected to the reservoir 40 and allows fluid to flow from the valve body 30, depending on which specific cycle is being performed at a given time. A drain 44 is used for various cycles to purge used or spent fluid from the system. The arrows in the various Figures indicate which of these inlets/outlets will be used for each of the various cycles.

The valve body 30 is best shown in FIGS. 2 and 3. Valve body 30 includes inlets and outlets to connect the system 10 to a water or fluid source, a chemical source and the treatment reservoir, as well as the treated fluid system being fed by the system 10. The valve body 30 is depicted as exemplary of any of several valve body configurations that are known and used in the art and should not be considered limiting to the present invention. The valve body 30 may be modified depending on the specific needs for an individual treatment system. Such valve bodies 30 are capable of regenerating with brine solutions, chlorine, potassium permanganate, hydrogen peroxide and others for use as regenerants in water softening and filtering processes.

Figure 10A:
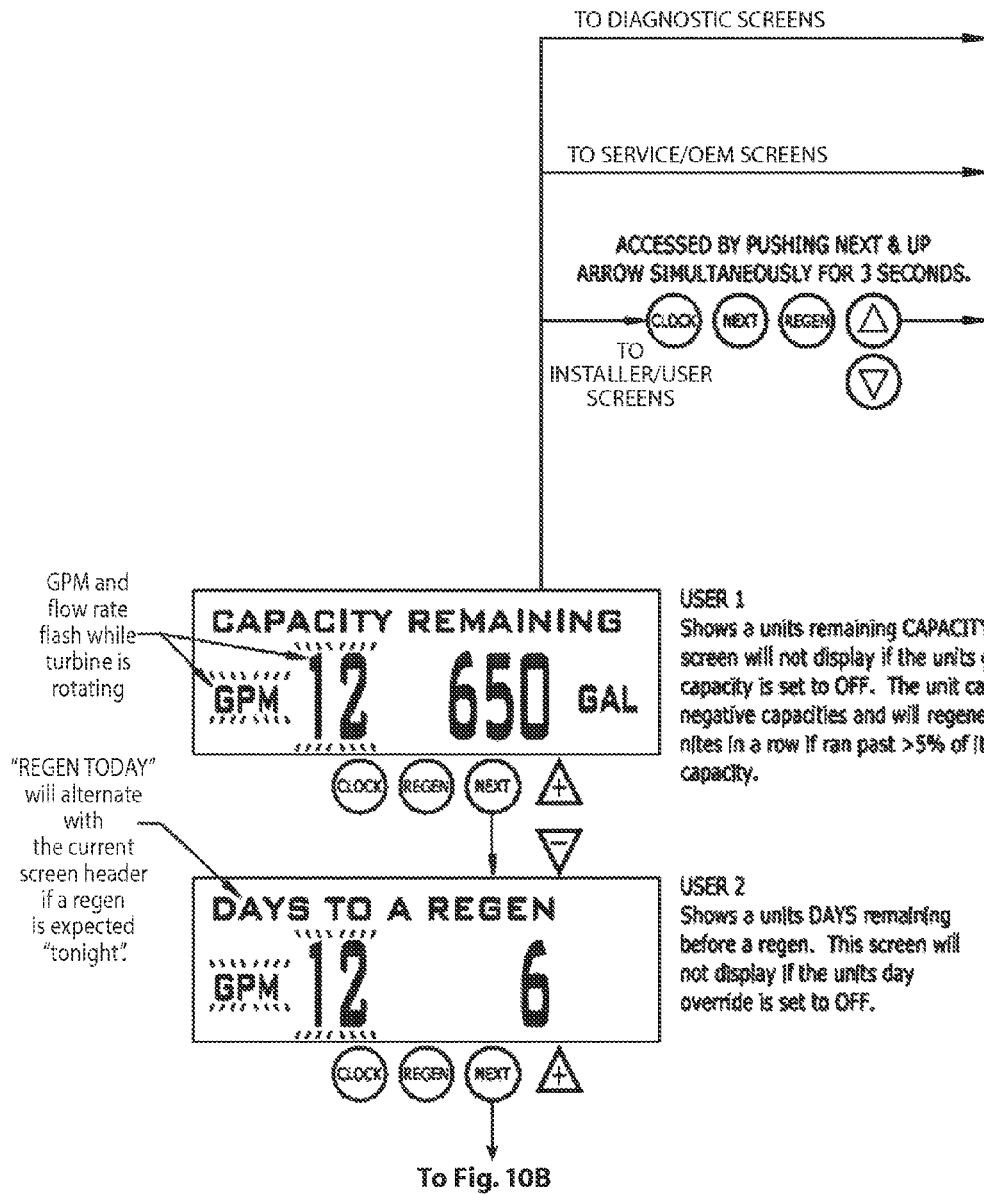
FIG. 10A-10B is a flow chart of the user display screens of a regeneration system according to the present invention.
Figure 10B:
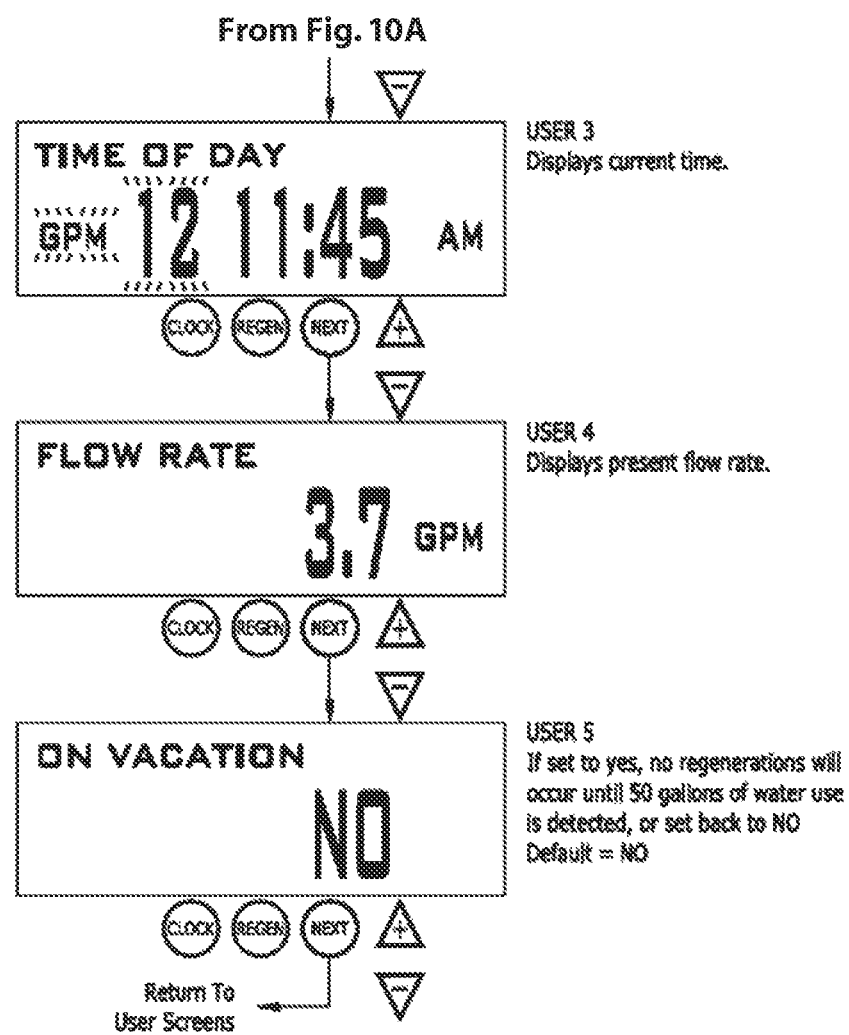

To further explain the invention and to show how it is incorporated into a water treatment device, FIGS. 10 through 13 depict flow charts incorporating various setup and monitoring functions used in connection with the present invention. FIG. 10 depicts various functions that are shown on the display screen 24 during normal operation of the regeneration device. The normal operation screen variables shown include: capacity of the system, predetermined days until a regeneration sequence will occur, flow rates including the current flow rate and the flow rate during regeneration, and time of the day. The normal operation screens also may show default features.

Figure 11A:
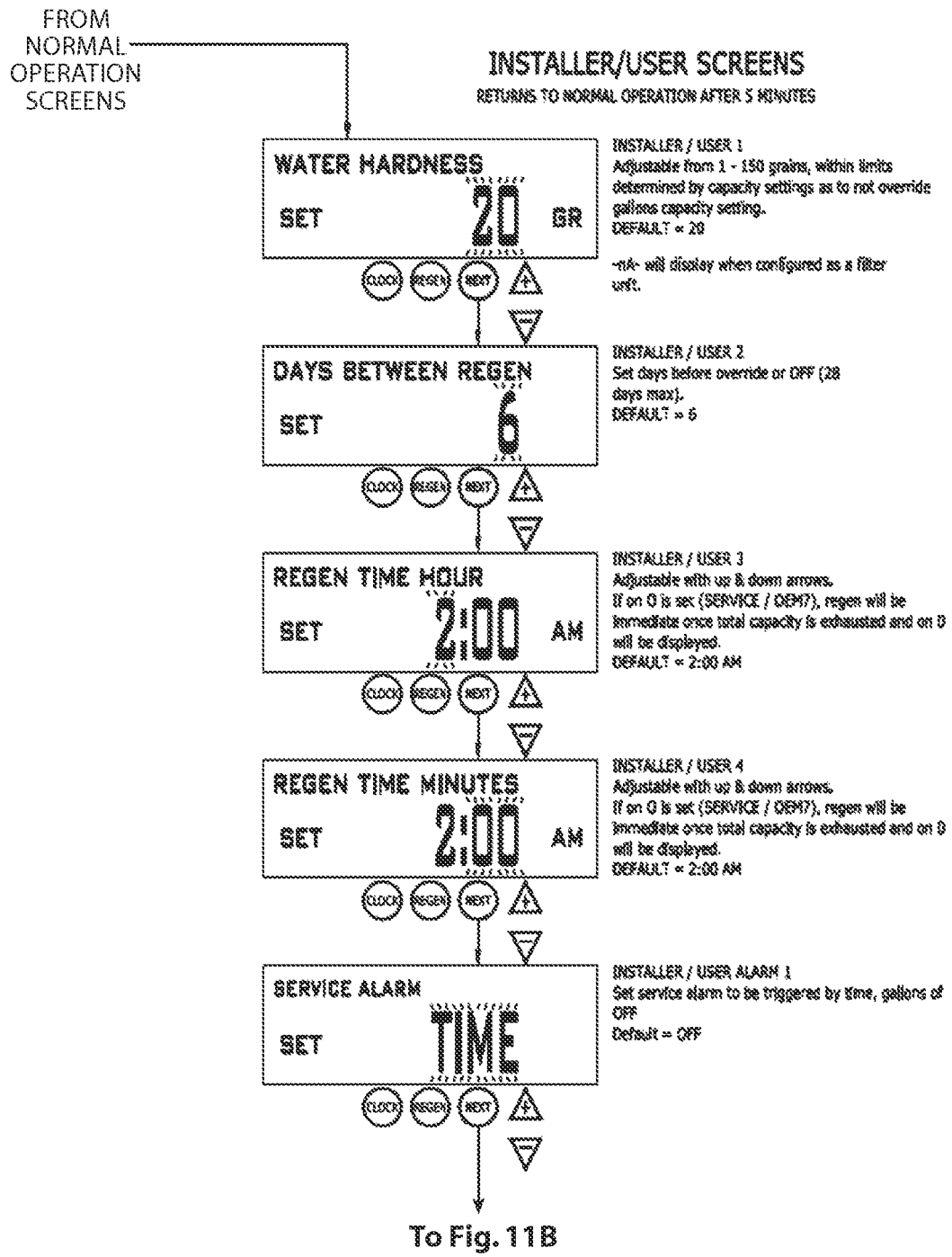
FIG. 11A-11B is a flow chart of the dealer setup display screens of a regeneration system according to the present invention.
Figure 11B:
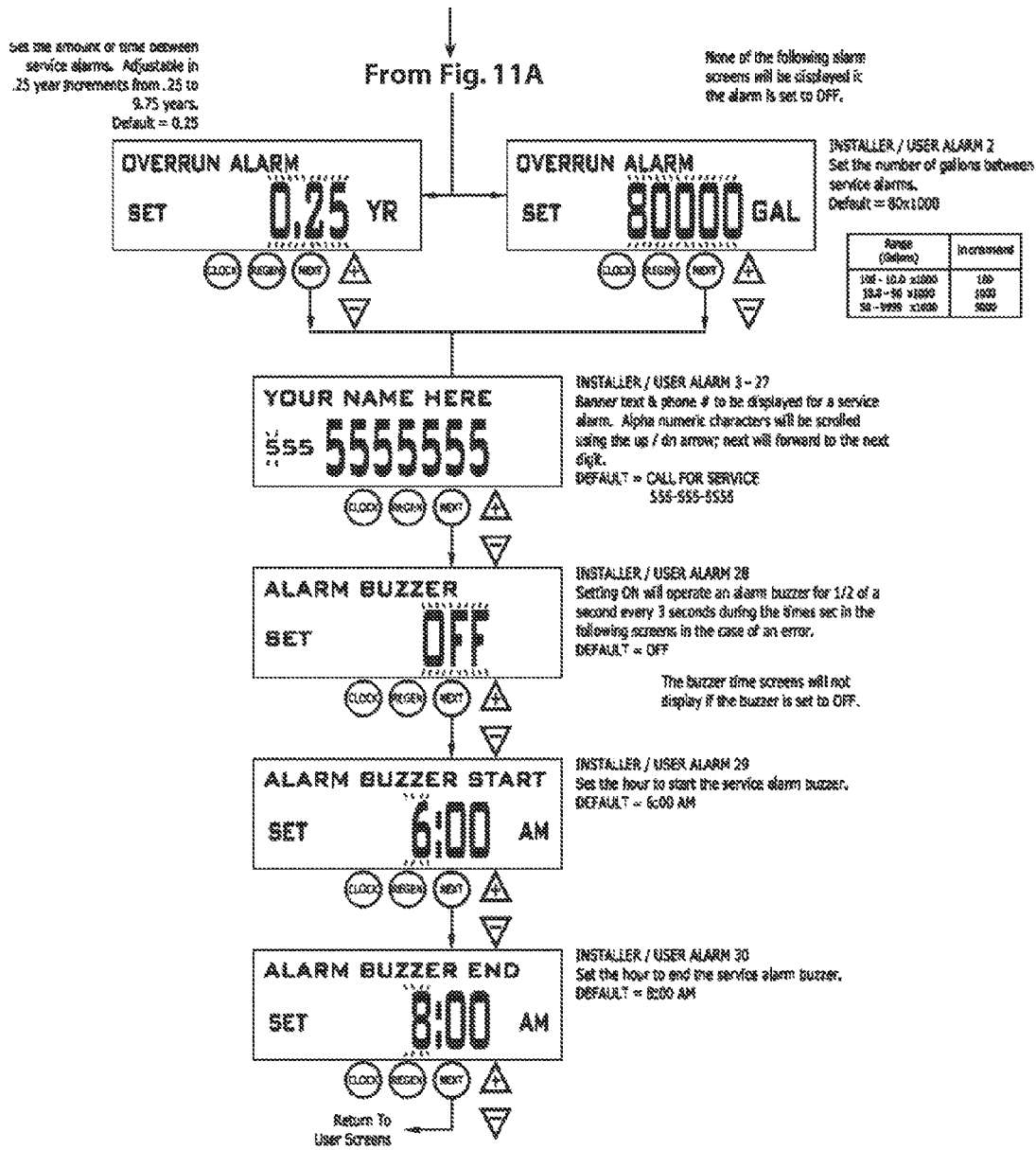

FIG. 11 depicts a flow chart for an installer to set during installation of a water softener. When entering the water hardness in the first depicted screen, the unit computes its capacity by dividing the grains of capacity which is typically set by the manufacturer (32,000 as referred to by example above) by the water hardness. A system with 32,000 grains of capacity divided by a hardness of 20 grains will have a capacity of 1,600 gallons of water. Thus, 1,600 gallons of water can be treated before a full regeneration sequence is required by the system. The manufacturer also typically sets the "days over ride" or maximum days between regeneration shown in the next screen. The installer can adjust the number of days if necessary. The time of day for regeneration to occur, which is ideally at a time of minimal or no water usage, is set by the installer. As further shown, the system also allows for alarms to be activated when service should be performed on the system, with the ability to direct the service to a specific operator or installer of the system, possibly the installer who originally setup the system.

Figure 12:
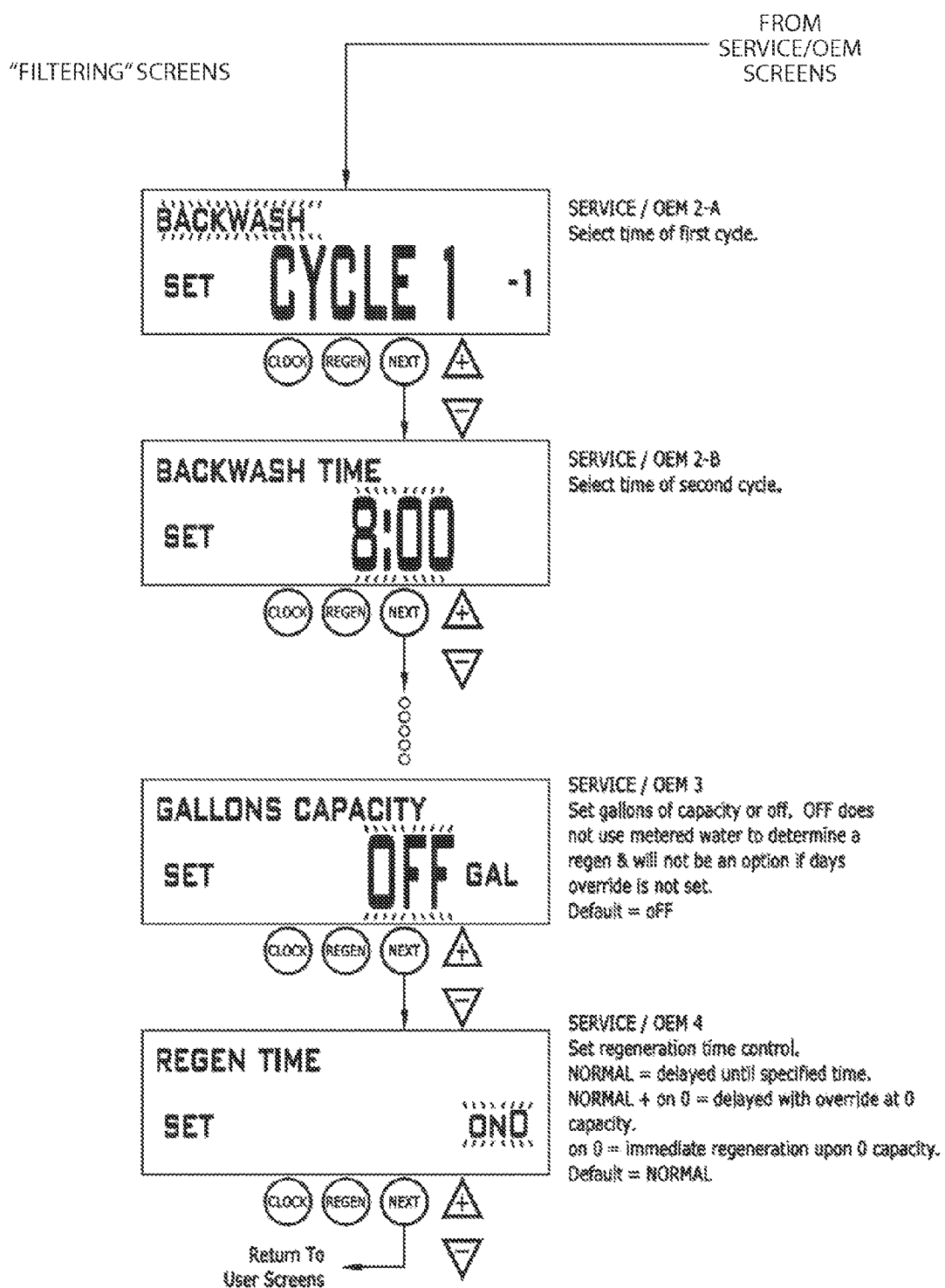
FIG. 12 is a flow chart of the manufacturer program screens of a regeneration system according to the present invention.

FIG. 12 shows a flowchart for a filtering cycle for the present invention as set by the system manufacturer. The flowchart in FIG. 12 will be accessed from the flowchart shown in FIG. 1. Like the softening sequence, the filtering sequence can be set to operate for a predetermined capacity of the system.

Figure 13A:
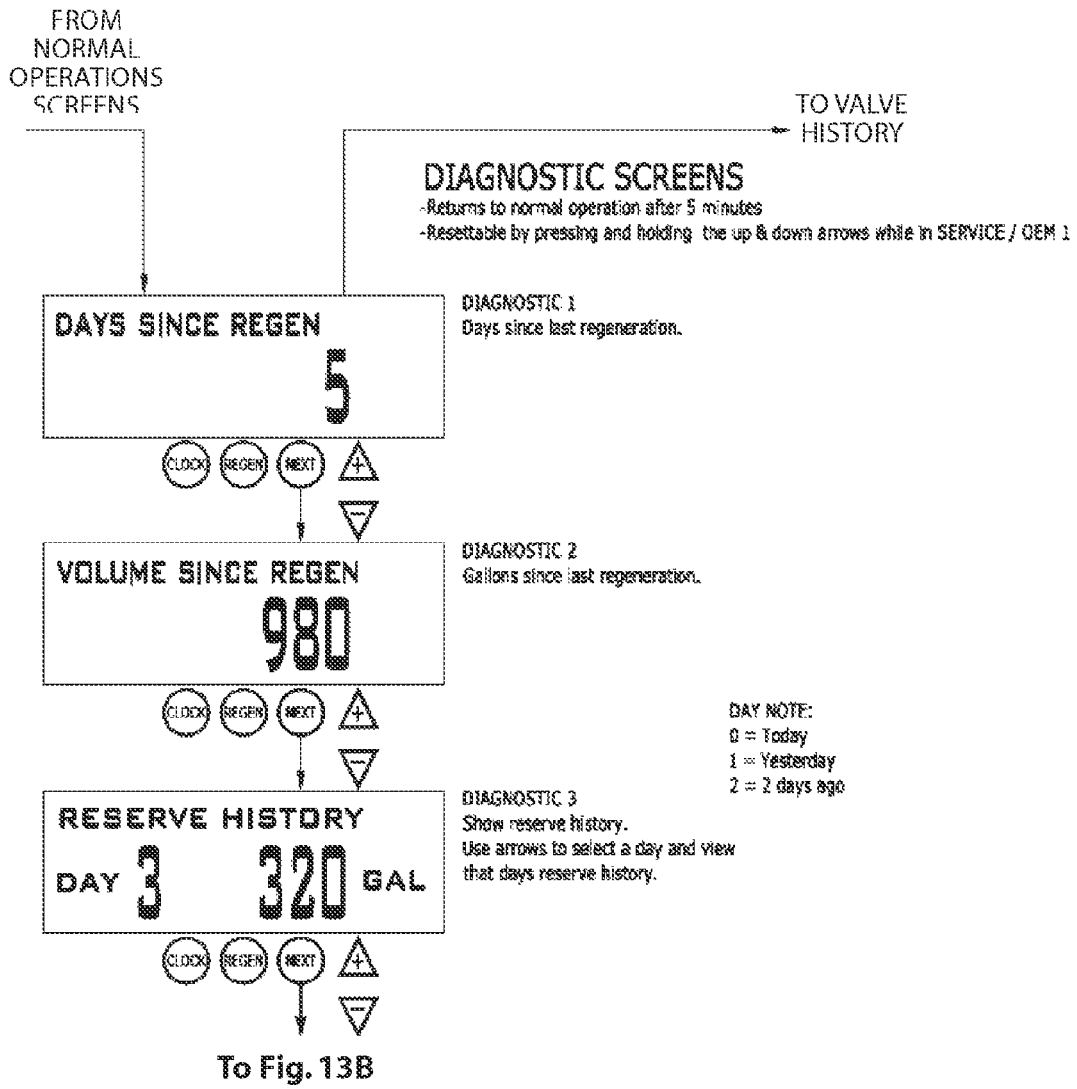
FIG. 13A-13C is a flow chart of the diagnostic screens of a regeneration system according to the present invention.
Figure 13B:
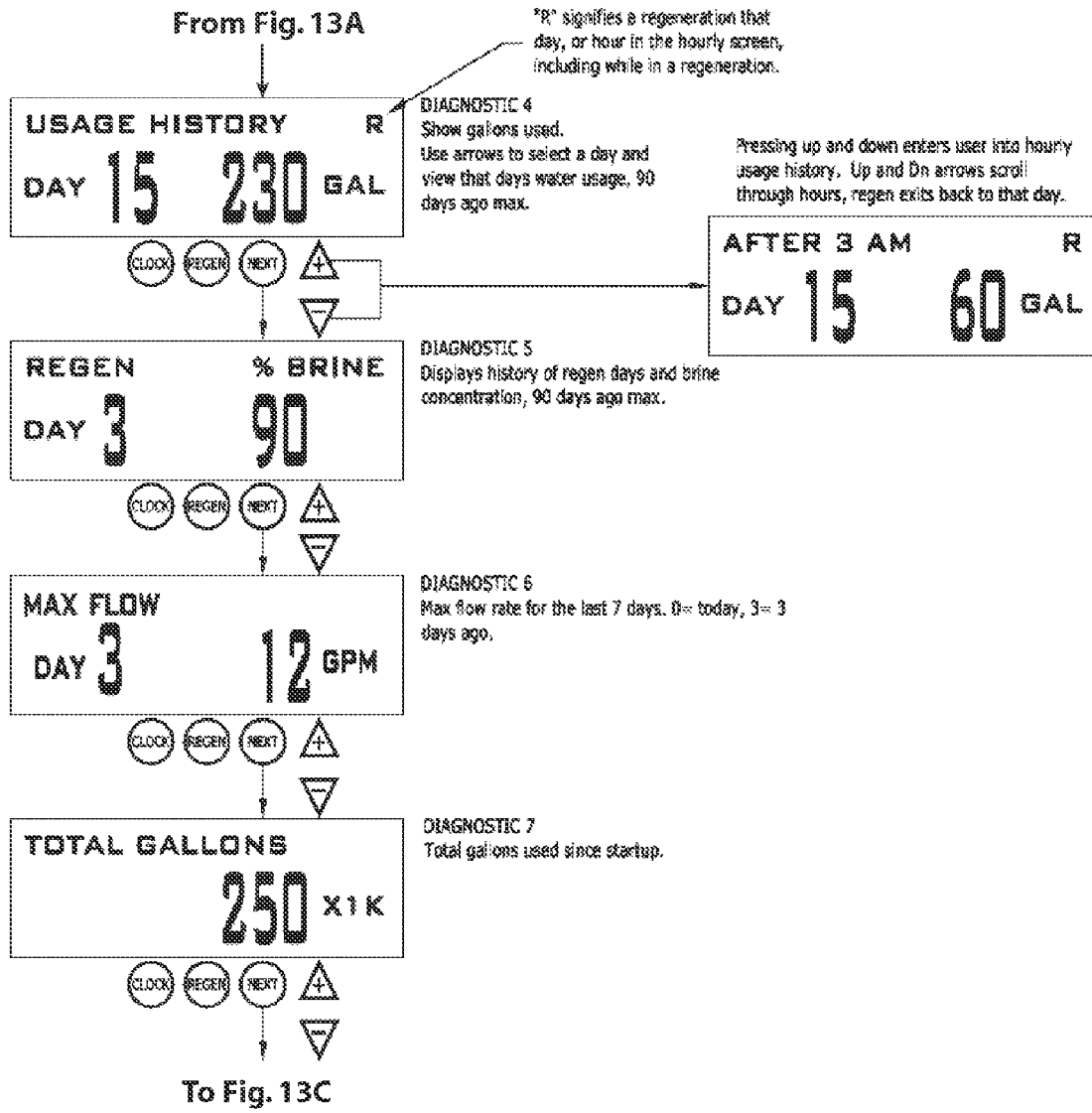
Figure 13C:
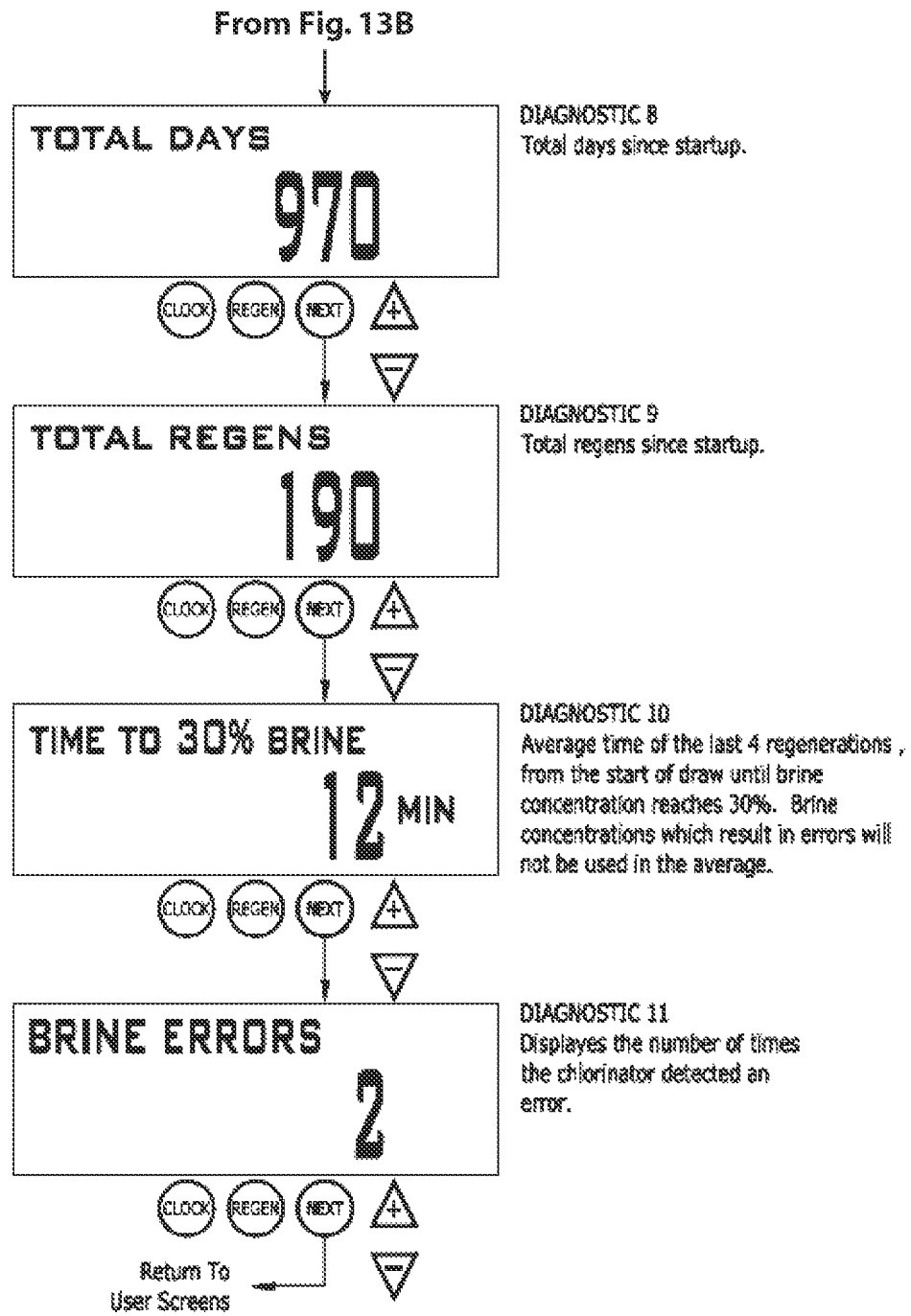

FIG. 13 provides a flowchart depicting various data screens that a service technician can use to perform diagnostic functions on the system. For instance, the volume that has flown through the device since the last regeneration performed, the total amount of time the system has been in operation, or the total volume that has flown through the system since the system has been in operation. Such data may be useful in determining whether the system is operating properly or not. The system also has the ability to detect the number of errors that may arise during running of the system, which can be further used by the service technician in assessing reoccurring and/or isolated problems in the system.

Figure 14:
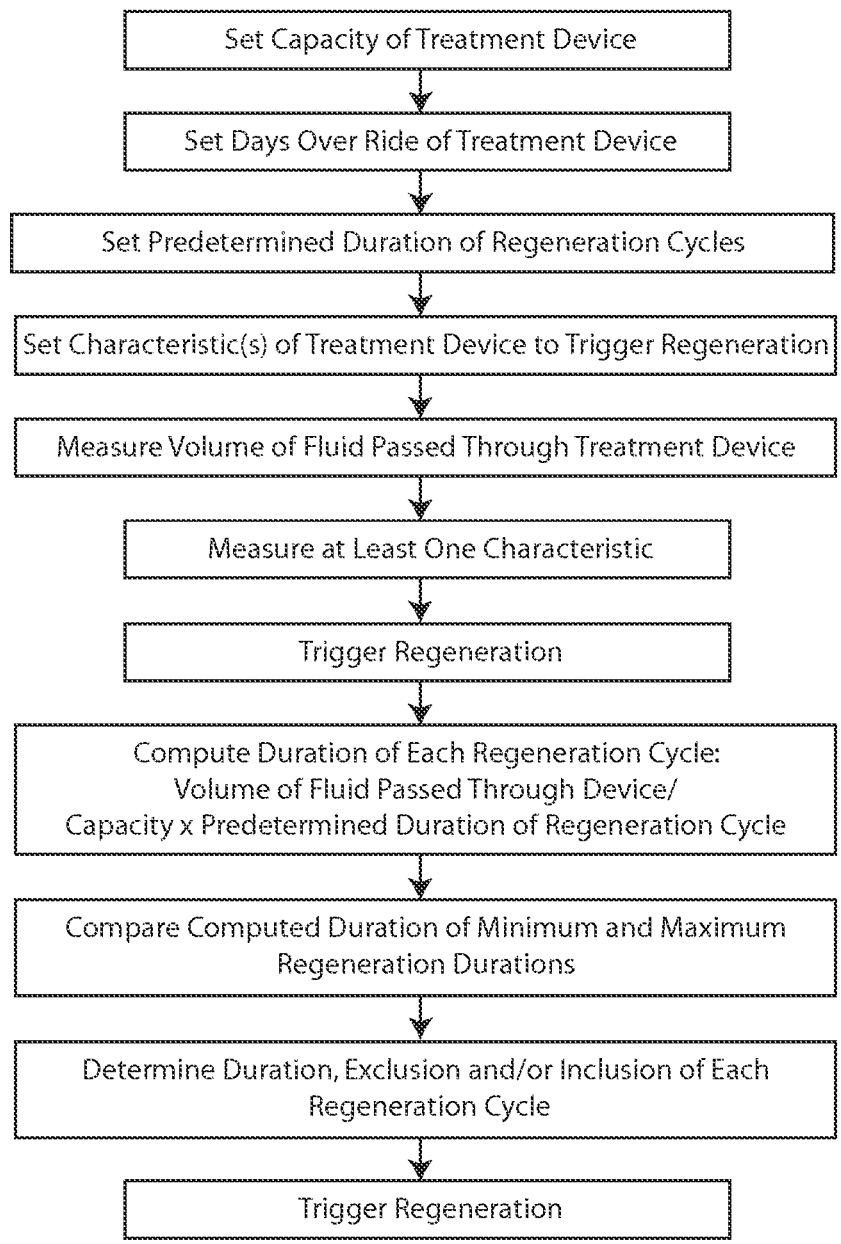
FIG. 14 is a flow chart for the operation of a regeneration system according to the present invention.

FIG. 14 shows a flowchart of the steps utilized by the present invention to modify the duration of each selected regeneration cycle depending upon a measured characteristic of the device such as volume of water treated, time since last regeneration occurred, etc. The steps include providing a water treatment device, setting a predetermined capacity of the treatment device, setting the maximum number of days until regeneration is required ("days over ride"), and setting a predetermined duration for each regeneration cycle. The regeneration cycle has at least one stage such as backwash, down brine, up brine, rinse, and brine tank fill. The next step is setting at least one characteristic of the water treatment device to trigger regeneration. The characteristic can be the volume of water passed through the device as measured by a meter, the time the device has been in operation as measured by a clock, the differential between the pressure of fluid entering the device compared to the pressure of the fluid leaving the system and/or a sensor output. For example a sensor output commonly used in water treatment uses a first probe to measure conductivity of the resin bed in first location and a second probe to measure conductivity in a second location. When a comparison of the probe outputs differs by a predetermined factor, the resin bed needs to be cleaned and regenerated.

The next step is programming the device to initiate a regeneration sequence upon at least one characteristic achieving said setting. As water treatment begins, the device begins measuring at least one characteristic of the water treatment device. This measurement is periodically compared with the programmed predetermined setting to determine whether or not regeneration is required. The volume of water passing through the water treatment device since the prior regeneration is also measured. Once regeneration has been triggered, the duration of each cycle of the regeneration sequence is computed based upon the following formula:

(Volume of Fluid Treated/Capacity of Device)×Predetermined Duration of Cycle

Preferably, the duration of each cycle should not be below a pre-set minimum or above a pre-set maximum. For this reason, the computed regeneration duration is compared with the minimum and maximum regeneration durations and the appropriate duration is selected. If the device is programmed to regenerate at a specific time of day or night, the regeneration sequence will not be initiated until that time. Alternatively, the device may calculate its average daily water usage and compare the average daily usage with its remaining capacity to determine when the appropriate day for regeneration is.

Duration is defined as any variable to measure a length or magnitude, such as a volume (gallon, liter), time (hour, day, week) number of cycles (10 cycles, 3 cycles), sensor output, pressure differential or other variable to measure the fluid passing through the system.

In some instances, it may be desirable for the device to add a cycle or to omit a cycle or to change the order of cycles. For example, if water usage has been excessively high, it may be desirable to have two backwash cycles, one before brining and one after brining. Alternatively, if water usage has been quite low, the backwash or rapid rinse cycle or programmed multiples of these cycles may be entirely eliminated during the regeneration sequence.

The present invention alternatively or additionally provides systems and methods comprising of an additional fluid release cycle during regeneration operations for treating and monitoring fluids in a fluid treatment apparatus, such as a residential or commercial water treatment system. The invention allows for a modified, additional or alternate backwash cycle to be incorporated in a single fluid treatment apparatus and method. For instance, the present invention allows a water filtering or softening system that runs on a programmed regeneration sequence, such as that described above, to be programmed with a backwash air cycle that runs on a timed regeneration sequence. The backwash air cycle is preferably activated after a regeneration command is received by the control valve from a controller. When referring to the specific operations of the present invention, each of the individual cycles of operation, such as backwash, brine draw down, brine draw up, softening, filtering, rapid rinse and brine refill, will be referred to as a cycle or stage, with the overall cycles being referred to as regeneration sequences. Backwash air refers to a cycle or stage. The use of such language is used for clarification purposes and should not limit the scope of the invention in any manner.

Each of the individual cycles and the overall regeneration sequence is programmed to last or run for a specified duration or time. Duration is defined as any variable to measure a length or magnitude, such as a volume (gallon, liter), time (hour, day, week) number of cycles (10 cycles, 3 cycles), strength of regenerate solution (parts per million or chemical strength) or other variable to measure the fluid passing through the system. The duration of each cycle or the duration of a regeneration sequence may vary.

Figure 15:
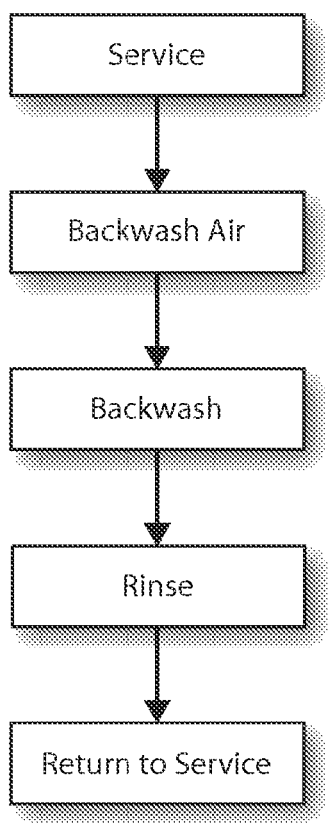
FIG. 15 is flow chart depicting stages and cycles that may be used in conjunction with the present invention.
Figure 16:
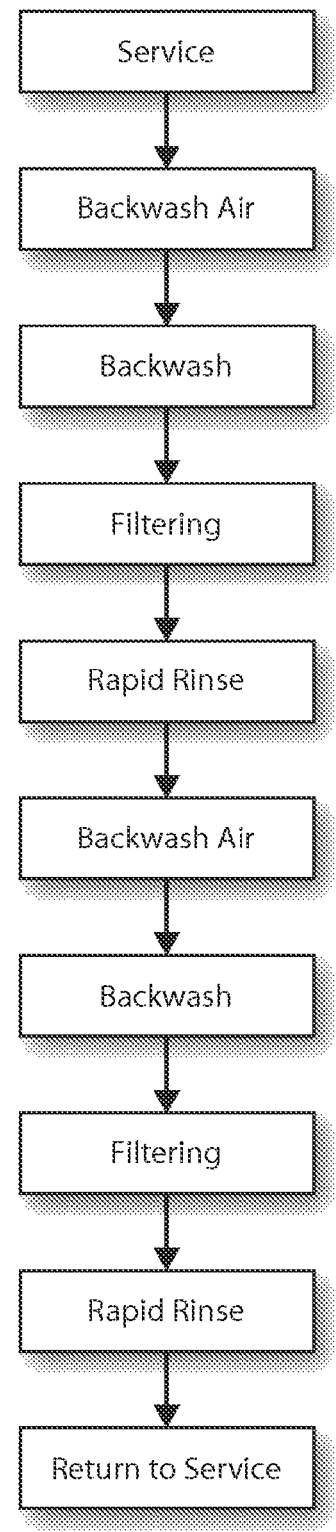
FIG. 16 is an alternate flow chart.
Figure 17:
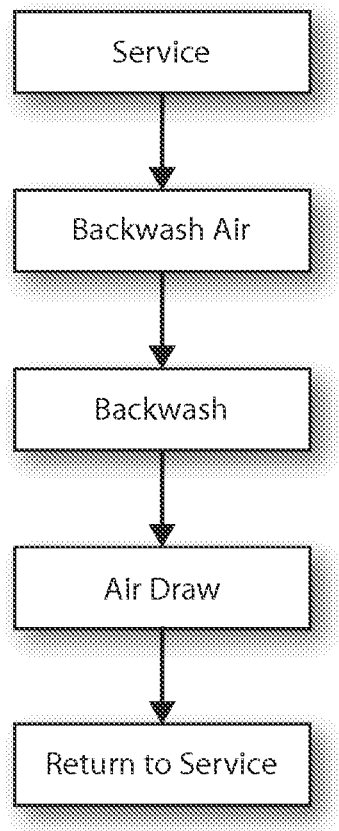
FIG. 17 is another alternate flow chart.

FIG. 15 shows a general flowchart for a typical filter sequence program. This sequence may be used in a system designed to remove particulate from an untreated water source. FIG. 16 shows a general flowchart for a typical acid neutralizing regeneration sequence. FIG. 17 shows a general flowchart for a typical sulfur and iron filtration regeneration sequence. On a typical fluid treatment system that incorporates the present invention, an operator will be able to program the regeneration cycles within the sequence. The operator first selects the order of the regeneration cycles within the regeneration sequence. That is, the regeneration sequence is programmed to determine which individual cycles or stages will make up the regeneration sequence. Next, the operator will set the operating parameters for each of the cycles used in the regeneration sequence, with the duration of operation of each cycle also being entered. In each of the exemplary sequences shown in FIGS. 15-17, the second cycle is the fluid release or backwash air cycle. It is to be understood however that any of the cycle positions could be a fluid release or backwash air cycle. This cycle is not limited to the second cycle in a regeneration sequence. The fluid release cycle allows a control valve on the fluid treatment apparatus to move at a slow, metered and controlled rate of speed from any cycle to the backwash air cycle. This allows any pressurized air and/or gases and water in the system to slowly escape. In other words, the system is slowly depressurized so that a turbulent or violent release of water and/or air and/or gases is not imparted through the system drain line.

Referring again to FIGS. 15-17, the number of specific cycles could be altered for any of the softening or filtering sequences. The cycles may be determinative by volume and/or time; the first or service cycle may run for 1,500 gallons of fluid passing through the system, whereby the second cycle, backwash air would run for ten minutes. Similarly, the first cycle may run after a time period (e.g., 1 week) or an amount of contaminants in the system (e.g., more than 75%). The system is capable of using any of these variables as a triggering function to commence a regeneration sequence.

Figure 18:
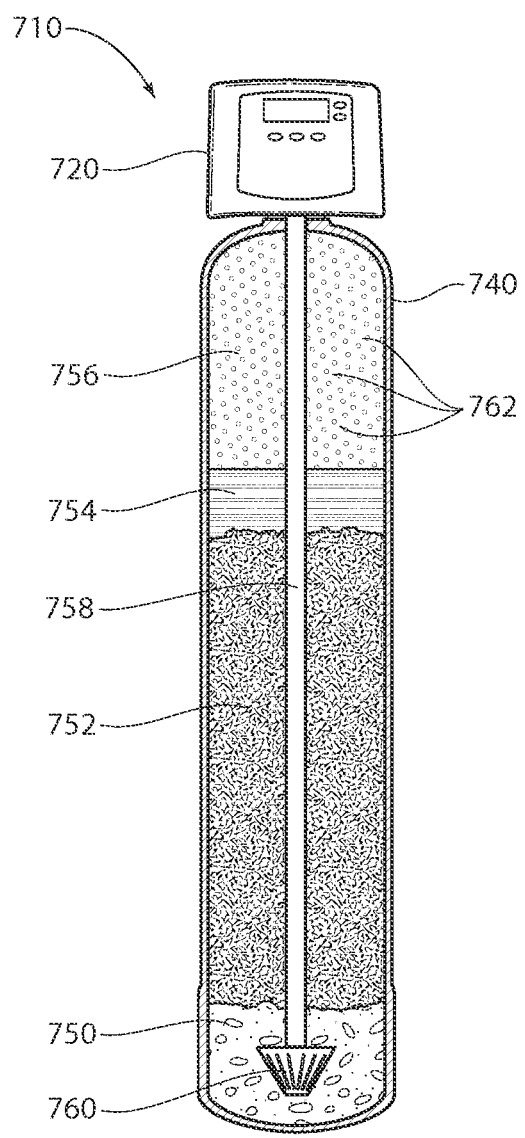
FIG. 18 is a partially cut away front elevation view of the control valve and treatment tank of the present invention.
Figure 19:
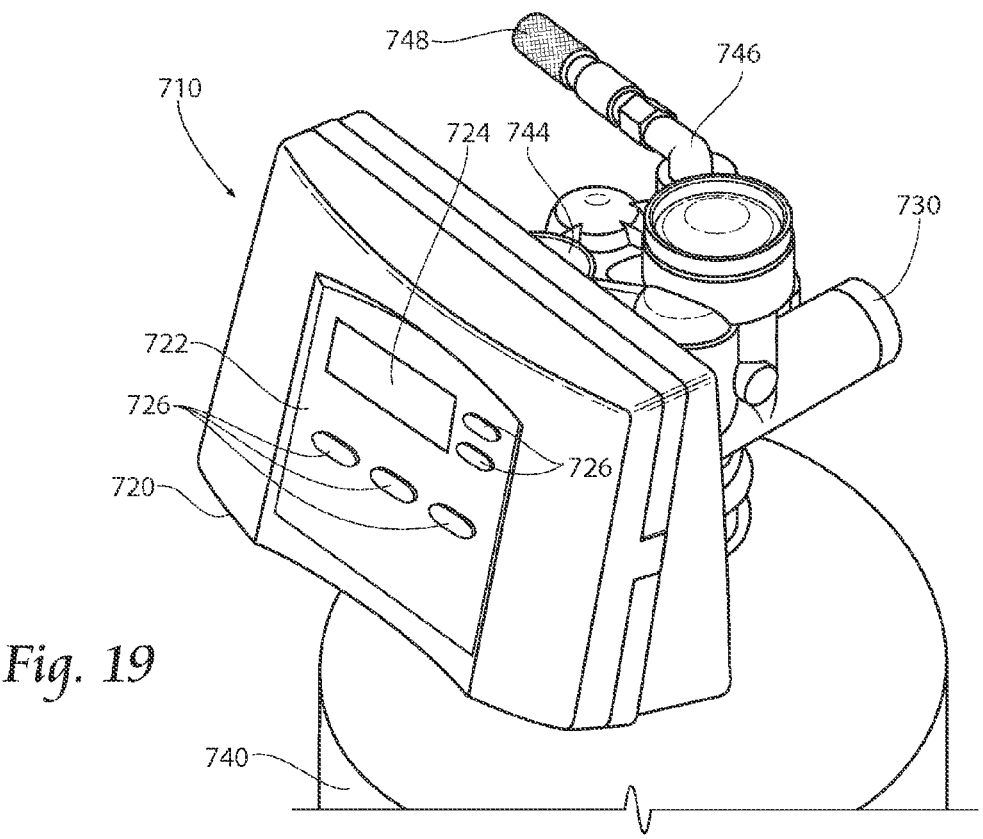
FIG. 19 shows a front perspective view of an apparatus that incorporates the present invention.
Figure 20:
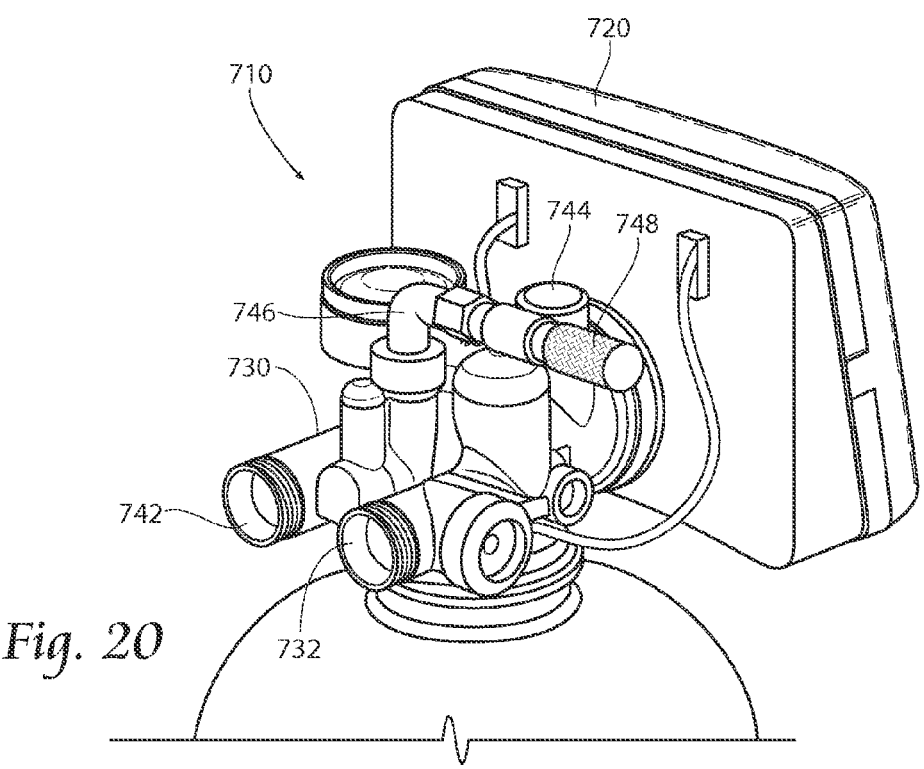
FIG. 20 shows a rear perspective view of the apparatus of FIG. 19.

While the present invention may be embodied and employed in any of several fluid treatment apparatuses, examples of such apparatuses can be seen in the following drawings. FIGS. 18-20 show an air chamber water treatment system 710. Referring to FIG. 18, the system 710 has a programmable controller 720, which may be similar or identical to the controller 20 described above, and valve 730 (see FIGS. 19 and 20) that are supported on a treatment reservoir or tank 740. Quartz gravel underbedding 750 or an equivalent media is placed in the bottom of the tank 740. Above or on top of the underbedding 750 is an ion exchange or filter media. The tank 740 is partially filled with water 754 so that the water preferably occupies between ⅔ and ¾ of the tank 740 by volume. An air charge or gas charge region 756 is formed between the upper water level and the top of the tank 740. A draw tube or pipe 758, including a strainer 760 on its lower most end extends from the underbedding 750 to the valve body 730. The conical strainer 760 prevents the non-fluid contents of the tank 740 from being drawn up through the tube or pipe 758.

During the service or filtration process in an air chamber system, water is passed through the control valve 730 and sprayed 762 into the tank 740. The precipitates formed by the spraying process are filtered from the water as both pass through the media bed 752. Filtered water is withdrawn from the tank 740 through the draw tube 758 while the contaminants axe trapped within the media bed 752. After a predetermined period of time or after a predetermined amount of water has passed through the media bed 752, the system must be cleaned or recharged. In this condition, the system initiates a regeneration cycle.

If a micronizer is employed in the system or natural gases are present in the untreated water passing through the system, the air introduced by the micronizer or the gases present in the water pass through the control valve 730 and into the tank 740. Unlike the air chamber system where the tank 740 is only partially filled with water, the excess gases 756 that build up in the upper region of tank 740 in a micronizer system or with the presence of natural gases in the system actually displace water from the tank 740. In the case of the micronizer, this process also enhances the oxidation of the contaminants in the water to form precipitates.

Now referring to FIG. 19, the controller 720 has an interface 722, which provides an area for a display screen output 724, which is capable of displaying the flow charts depicted in FIGS. 15-17. The controller 720 also has various buttons 726 that allow the cycles of the sequence to be programmed for the system 710. Two exemplary individual cycles are depicted passing through the multiple configurations of the valve body 730 in FIGS. 21 and 22.

The valve 730 is best shown in FIGS. 19 and 20. Valve 730 includes inlets and outlets to connect the system 710 to an untreated water or fluid source, a chemical source and/or air source and the treatment tank 740, as well as a treated water or fluid output that is fed by the system 710. The valve 730 is depicted as exemplary of any of several valve configurations that are known and used in the art and should not be considered limiting to the present invention. The valve 730 may be modified depending on the specific needs for an individual treatment system.

Figure 21:
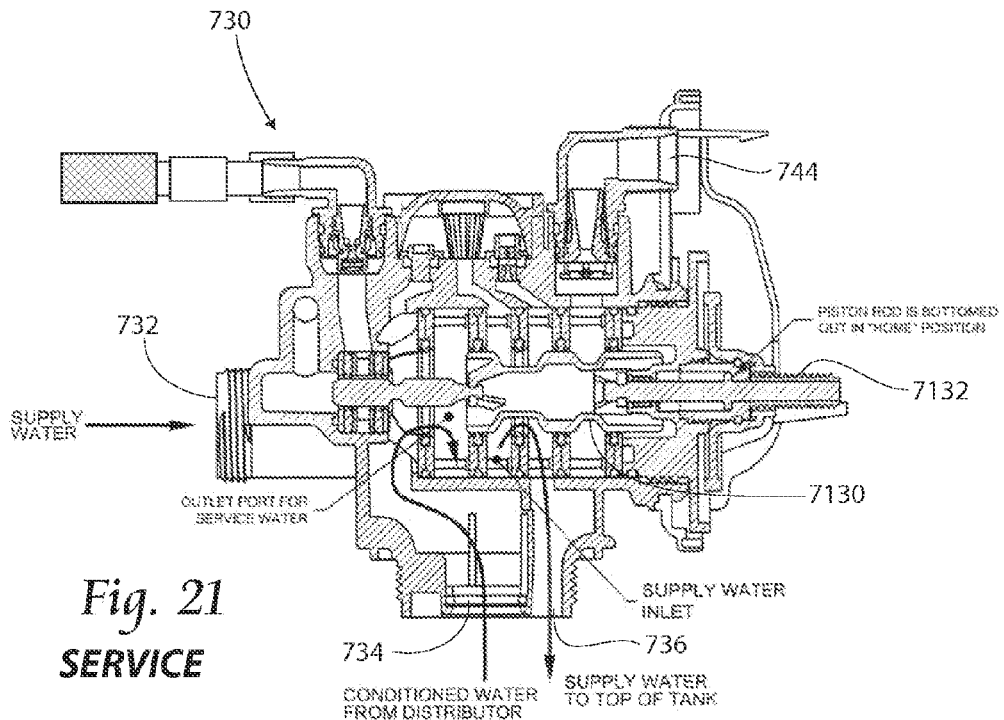
FIGS. 21 and 22 provide various exemplary flow patterns through a valve body used in connection with the present invention.
Figure 22:
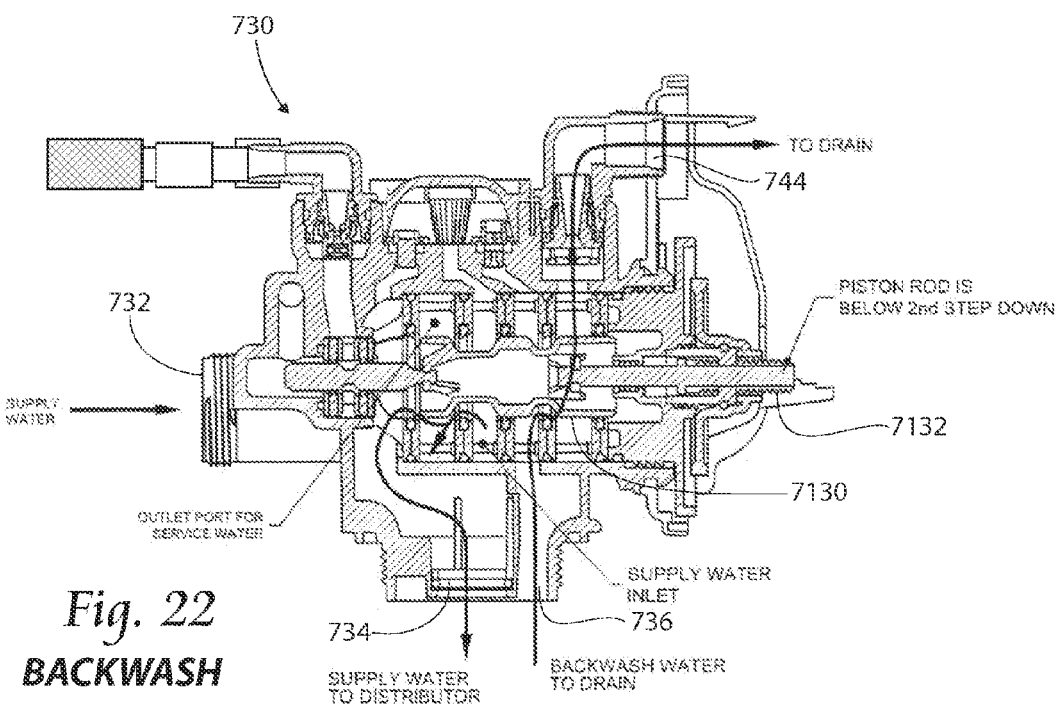

The valve 730 has a fluid inlet 742, which allows untreated water into the valve 730 and a fluid outlet 732 for treated water, which are best shown in FIG. 20. As shown in FIGS. 21 and 22, inlet/outlet 734 is connected to the tank 740 (through the draw tube or pipe 758 as shown in FIG. 18) and allows fluid to be brought into the valve 730 and circulated through the valve body. An outlet 736 is also connected to the reservoir or tank 740 and allows fluid to flow from the valve body 730, depending on which specific cycle is being performed at a given time. Referring again to FIGS. 19 and 20, a second fluid outlet or drain 744 is provided for various cycles to purge used or spent fluid from the system 710. The arrows in the various Figures indicate which of these inlets/outlets will be used for each of the various cycles. In an air system, an air inlet 746 is formed in the valve body 730 and typically includes a filter or screen 748. As an alternative method of introducing air into the system, a micronizer may be installed in-line and upstream of the untreated water inlet. The micronizer, which would be installed upstream of inlet 742, draws air into the system 710 as treated water is expelled from the system.

The valve 730 is a piston type fluid treatment valve that is known in the art. The valve shown in FIGS. 19-22 is manufactured by the Clack Valve Corporation of Windsor, Wis. The valve is described in U.S. Pat. Nos. 6,776,901; 6,444,127 and 6,402,944; each incorporated herein by reference. As shown in FIGS. 21 and 22, a valve piston 7130 is mounted on a piston rod 7132. The valve piston 7130 moves within a valve body 730 having multiple openings or passageways for fluid flow. An electric motor drives a series of gears or gear train. The direction of rotation of the motor as well as the duration that the motor runs and drives the piston to the desired location within the valve body defines a predetermined passageway for fluid flow. In this embodiment, the rotational motion of the electric motor is converted into reciprocal motion by the gear train to move the valve piston 7130 within the valve body 730.

Figure 23:
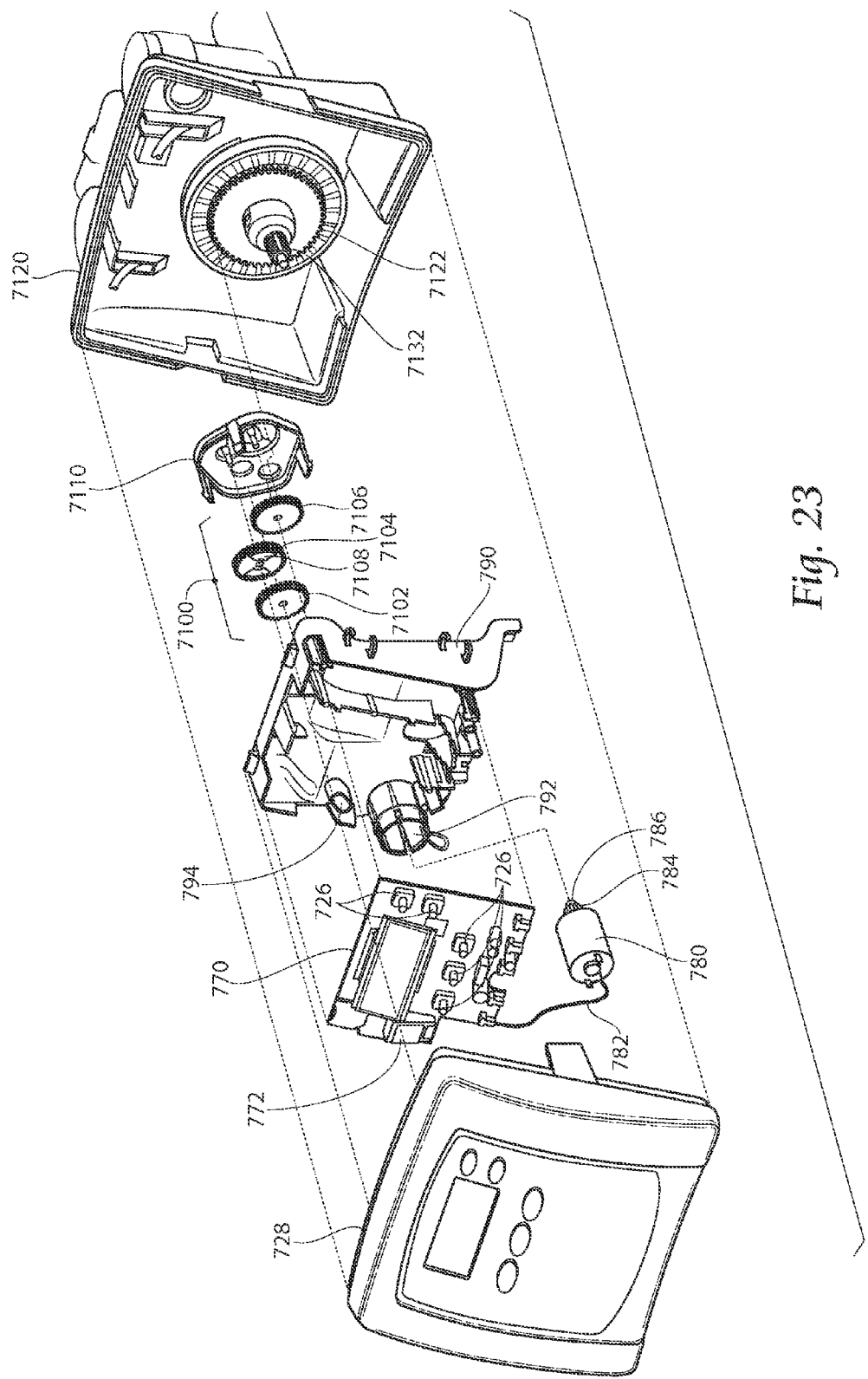
FIG. 23 is an exploded perspective view of an apparatus that incorporates the present invention.

FIG. 23 is an exploded view the cover 728 of the controller 720, the circuit board 770, the motor 780, the mid plate 790, gear train 7100 (including gears 7102, 7104, 7106), gear bracket 7110 and back plate assembly 7120. The electric motor 780 may comprise any of a number of reversible motors and preferably has variable torque capability. For instance, the motor 780 could be an asynchronous AC motor or a stepper motor. In a preferred embodiment, the motor 780 comprises a reversible electric DC motor. The motor is connected to the circuit board 770 of the controller 720 by wiring 782. The motor 780 is attached to the mid plate 790 by a receptacle 792. Stepper gear 7102 mates with the pinion gear 784 affixed to the drive shaft 786 of the motor 780. The motor is mounted in the receptacle 792 such that the pinion 784 extends through the rear wall of the mid plate 790.

The gear train 7100 may comprise any structure for transferring torque from the pinion 784 of the motor 780 to the driven gear 7122. In a preferred embodiment, the gear train 7100 includes first, second and third stepper gears 7102, 7104 and 7106. Each gear has in input portion of a relatively large diameter and an output portion of a relatively small diameter. The first gear 7102 has an input portion that is driven by the pinion 784. The first gear 7102 drives the second gear 7104 and the second gear 7104 drives the third gear 7106. The third gear drives the driven gear 7122. The gear train 7100 is rotatably supported within gear bracket 7110 that is attached to the mid plate 790. Spindles formed in the gear bracket 7110 support each gear 7102, 7104 and 7106.

Figure 24A:
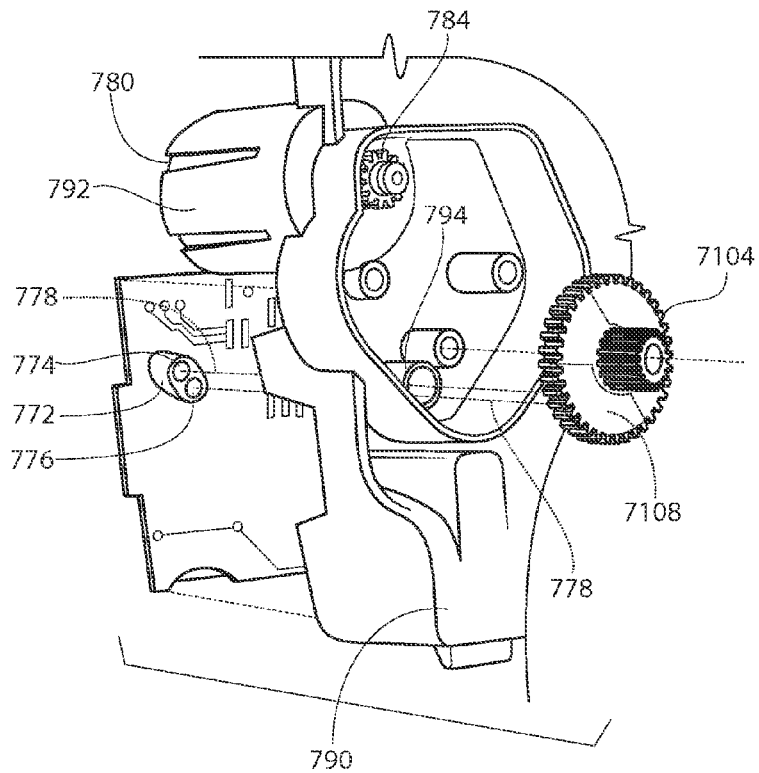
FIG. 24A is a partial exploded view of the apparatus of FIG. 23.
Figure 24B:
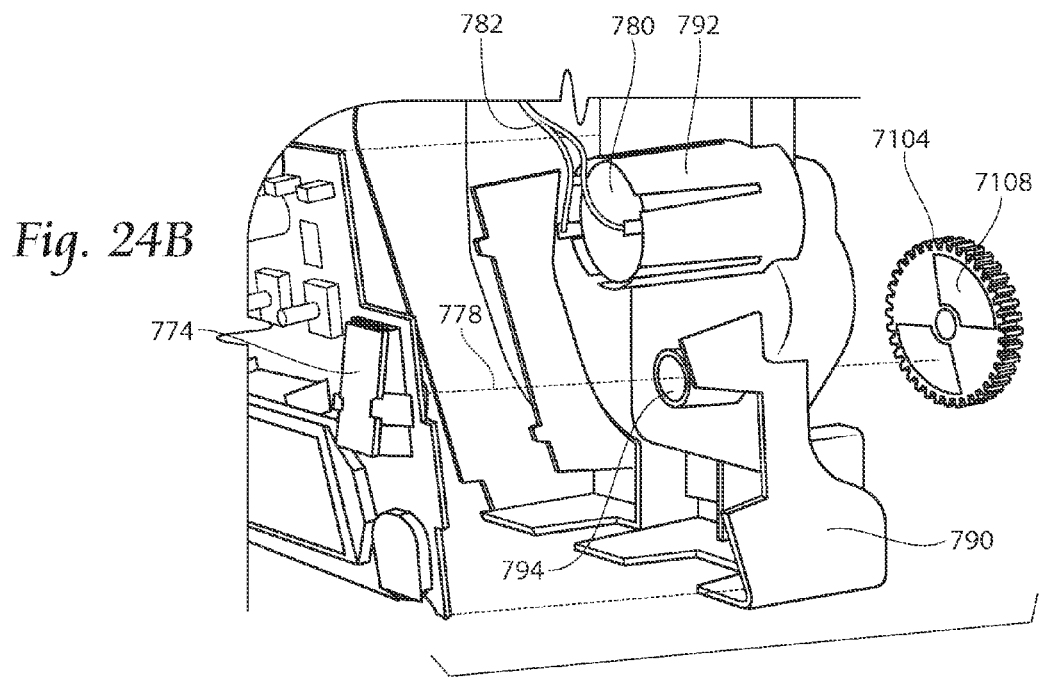
FIG. 24B is another partial exploded view of the apparatus of FIG. 23.

Referring to FIGS. 24A and 24B, the motor 780 is secured within the receptacle 792. As shown in FIGS. 23, 24A and 24B, an optic sensor 772 is attached to the circuit board 770. As best shown in FIG. 24A, optic sensor 772 has a light transmitting opening 774 and a light receiving opening 776. The light beam emitted by the sensor 772 is represented by dashed line 778. The light beam 778 passes through opening 794 in mid plate 790.

As shown in FIGS. 23, 24A and 24B, reflective material 7108 is adhered to or formed in second gear 7104. Reflective material 7104 could be foil, reflective tape or any similar type of material. When light beam 778 is emitted from optic sensor 772, the light beam 778 passes through opening 794 and then strikes gear 7104. If gear 7104 is positioned such that the light beam 778 strikes the reflective material 7108, the light beam is reflected back to the sensor 772. If the light beam does not strike the reflective material 7108, no light is reflected back to the sensor 772.

The system works as follows. When the fluid treatment apparatus receives a signal from the controller 720 to begin a regeneration cycle, it is necessary to move the valve piston 7130 within the valve body 730. For example, the valve piston 7130 may be moved from the service position to the backwash position. This is known as a regeneration command. The controller 720 briefly powers the motor 780 (e.g. turns the power on and then turns the power off). This sequence may be repeated one, two or three times depending upon the valve design. At the same time the optic sensor 772 is activated. As the motor 780 imparts rotational motion from its pinion 784 to the gear train 7100 for a very brief period of time, the optical sensor looks for an encoded pulse. An encoded pulse comprises a break in the light beam 778 transmitted from the transmitting opening 774 to the receiving opening 776. If the optic sensor 772 senses the pulse during the brief time period that the motor 780 is energized (which would be the last period of time the motor 780 is energized when the motor is energized multiple times in succession), a timer within the controller 720 is started. If no encoded pulse is sensed, the motor 780 is again powered for a very brief period of time. If a sensor 772 senses the pulse or break in the light beam 778, the timer is started. Once the timer starts, no additional power is sent to the electric motor 780 until the predetermined duration of time has elapsed Once elapsed, the motor 780 is again briefly energized once or for a predetermined number of successive times while the sensor 772 again looks for another pulse. As this process continues, the valve piston 7130 within the valve housing 730 is moved linearly a minute amount each time the motor 780 is energized. In a preferred embodiment, the valve piston 7130 is moved approximately one thousandths of an inch (0.001 inch) each time the motor is energized. In a preferred embodiment as the motor 780 is energized two, three or four successive times, the valve piston 7130 is moved two, three or four successive times (or approximately 0.002 to 0.004 inches), the system is idle for thirty (30) seconds, the valve piston 7130 is moved again three or four successive times, the system is idle for thirty (30) seconds, etc. This process is carried out for a predetermined time period of about six (6) minutes.

As will be apparent, this process can be repeated for a predetermined period of time or a predetermined number of times. As an alternate example, assuming the sensor 770 senses a pulse each time the motor 780 is briefly energized, the motor is energized so that the valve piston 7130 opens approximately one thousandth of an inch, the valve piston 7130 is stopped for 30 seconds, the motor is energized again so that the valve piston opens approximately one thousandth of an inch, the system is stopped, 30 seconds later the motor is again energized, and so on. This process is continued over a predetermined time period, for example a ten (10) minute time period.

Regardless of the sequence and duration of this air release or backwash air cycle, at its conclusion the valve piston 7130 is moved a sufficient amount and over a sufficiently slow time period to allow the pressurized fluid (air and/or as and water) within the tank 740 to be slowly and controllably released through the control valve 730 in a non-turbulent flow. As described above, this prevents the violent and turbulent flow of air and/or gas and water from the tank 740 through the drain 744 and its drain line.

The figures and description above merely exemplify the many different arrangements that may be incorporated into the present invention. Provided that a fluid release cycle can be accomplished and programmed within a single system, the system would fall within the present invention. In addition, the system may include a plurality of cycles either before or after the fluid release cycle. The system is designed for use in residential and commercial settings. Each of the sequences can have any desired number of cycles or steps that will effectively treat the water in the system and it may also be possible to incorporate other cycles if necessary. As stated, the system can also be used to monitor various parameters of the system, such as the volume of water passing through the system, the number of individual regeneration cycles run through the system, the chemical concentration within the system, and the time the system has been active or inactive. The system could be programmed so that a fluid release cycle or backwash air cycle will be activated after a certain amount of water has run through the system or after a predetermined period of time.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A method for treating water, said method comprising:
   providing a water treatment device having a programmable controller coupled to a valve assembly which controls fluid flow between a plurality of ports, the controller configured to manage a first regeneration sequence followed by a second regeneration sequence, each of the first and second regeneration sequences comprising one or more correlative regeneration cycles, wherein the controller has been programmed with:
   a predetermined capacity of the treatment device,
   a first predetermined duration for each regeneration cycle of the first regeneration sequence, and
   a trigger limit of at least one characteristic of the water treatment device to trigger a regeneration sequence;
   prior to an initiation of the second regeneration sequence, measuring a volume of water passed through the water treatment device since the completion of a prior regeneration sequence;
   initiating with the controller the first regeneration sequence;
   after the first regeneration sequence, programming the controller with a second predetermined duration for at least one correlative regeneration cycle of the second regeneration sequence, the second predetermined duration being substantially equivalent to the first predetermined duration of the correlative regeneration cycle of die first regeneration sequence multiplied by the measured volume of water divided by the predetermined capacity of the treatment device; and
   during at least one of the first regeneration sequence and second regeneration sequence, moving a piston in the valve assembly linearly through a plurality of successive steps, a distance of about 0.001 inches to about 0.005 inches.

2. The method of claim 1 wherein the first regeneration sequence has at least one cycle selected from the group consisting of: backwash, down brine, up brine, rinse, rapid rinse and brine tank fill.

3. The method of claim 1 wherein the second regeneration sequence occurs at a predetermined time of day.

4. The method of claim 1 wherein the second regeneration sequence occurs during a time period of minimal water use.

5. The method of claim 1 further including the step of, with the controller, automatically computing an average amount of water treated on a predetermined day, computing the remaining capacity of the device by subtracting the measured volume of water passed through the water treatment device since the completion of the first regeneration sequence, comparing the remaining capacity with the average amount of water treated on the predetermined day and initiating the second regeneration sequence if the amount of water treated on the predetermined day exceeds the remaining capacity.

6. The method o f claim 1, wherein the second regeneration sequence has more regeneration cycles than the first regeneration sequence.

7. The method of claim 1, wherein the second regeneration sequence has fewer regeneration cycles than the first regeneration sequence.

8. The method of claim 1, further comprising the step of pausing the linear movement of the piston between two of the successive steps for predetermined period of time.

* * * * *